United States Patent
Shirai et al.

(10) Patent No.: US 6,816,300 B2
(45) Date of Patent: Nov. 9, 2004

(54) OPTICAL APPARATUS

(75) Inventors: Kazushi Shirai, Tokyo (JP); Tetsuya Iishi, Tokyo (JP); Yohei Hanaki, Tokyo (JP)

(73) Assignee: Photocrystal Inc., Tokyo (JP)

( * ) Notice: Subject to any disclaimer, the term of this patent is extended or adjusted under 35 U.S.C. 154(b) by 0 days.

(21) Appl. No.: 10/641,281

(22) Filed: Aug. 14, 2003

(65) Prior Publication Data

US 2004/0032657 A1 Feb. 19, 2004

(30) Foreign Application Priority Data

Aug. 16, 2002 (JP) .......... 2002-237342
Sep. 5, 2002 (JP) .......... 2002-259547
Sep. 25, 2002 (JP) .......... 2002-278361
Aug. 5, 2003 (JP) .......... 2003-286479

(51) Int. Cl.[7] .......... G02F 1/09; G02F 1/00; G02B 27/28
(52) U.S. Cl. .......... 359/280; 359/484; 359/324; 359/281
(58) Field of Search .......... 359/280–283, 359/324, 492, 484; 335/219

(56) References Cited

U.S. PATENT DOCUMENTS

| 5,087,984 | A | | 2/1992 | Heiney et al. .......... 031/90 |
| 6,252,708 | B1 | * | 6/2001 | Cullen et al. .......... 359/484 |
| 6,392,784 | B1 | * | 5/2002 | Ikeda et al. .......... 359/282 |
| 2004/0027637 | A1 | * | 2/2004 | Sahashi et al. .......... 359/280 |

FOREIGN PATENT DOCUMENTS

EP  0 574 749 A2  12/1993
WO  WO 00/45214 A1  8/1993

OTHER PUBLICATIONS

Shirai, K. et al., "Nucleation of Domain Walls in Iron Garnet Single Crystals Grown from Liquid Phase Epitaxy," Journal of Applied Physics, American Institute of Physics, New York, U.S., vol. 82, No. 5, Sep. 1, 1997, pp. 2457–2460.
Rare–Earth Cobalt Magnets—REC Series, Online Jun. 8, 2001, XP002261485, retrieved from the internet on Nov. 14, 2003, p. 4; <url:http//web.archive.org/web/200006200-25123/www.tdk.co.jp/tefe02/e341.pdf>.

* cited by examiner

*Primary Examiner*—Georgia Epps
*Assistant Examiner*—M. Hasan
(74) *Attorney, Agent, or Firm*—Leydig, Voit & Mayer, Ltd.

(57) ABSTRACT

An optical device includes a Faraday rotator made of a bismuth substituted rare earth iron garnet single crystal (BIG) having a Faraday rotation of 45 degrees, and permanent magnets arranged beside the Faraday rotator to define two or more areas of a single domain structure in the Faraday rotator. Adjacent areas are magnetized in opposite directions to cause the polarization planes of light beams passing through the adjacent areas to rotate in opposite directions. The optical device satisfies the relation expressed by $Hs/Br/DH > \Delta D/2 > 0$ where Hs (Oe) is a saturation magnetic field of the BIG, DH ($cm^{-1}$) is a rate of change in magnetic field in the proximity to a boundary between the adjacent areas, Br (Gauss) is a residual flux density of the permanent magnets, and $\Delta D$ is a distance between the two light beams.

5 Claims, 13 Drawing Sheets

DISTANCE FROM BOUNDARY (mm)

- ① 1×1×1mm one row, 3 magnets
- ② 1×1×1mm two rows, 3 magnets in each row
- ③ 2×2×1mm two rows, 3 magnets in each row
- ④ 4×4×1mm two rows, 3 magnets in each row

US 6,816,300 B2

OPTICAL APPARATUS

FIELD OF THE INVENTION

The present invention relates to an optical element for use in an optical device utilizing the Faraday effect, and more particularly to a polarization independent optical isolator, an optical circulator, and a polarization beam combiner that are small and easy to assemble and require a very small number of components.

DESCRIPTION OF THE RELATED ART

FIG. 25 illustrates an optical circulator disclosed in Japanese Patent No. 2539563. The circulator includes an optical collimator that includes optical fibers 12 and 14 fixedly mounted to Ferrules 11 and 20, respectively, and lenses 22 and 23, and another optical collimator that includes an optical fiber 82 fixedly mounted to a Ferrule 81 and a lens 72. There are provided two birefringent blocks 21 and 71 for branching a light beam into two optical paths or combining light beams into one optical path depending on the direction of travel and the polarization direction of the incident light beam(s). There are also provided a pair of wave plates 37 and 38 that cause the light to be polarized in the same direction. The wave plates 37 and 38 are positioned in parallel with respect to the light path. Positioned adjacent the wave plates 37 and 38 is a Faraday rotator 31 to which a magnet 32 applies an external magnetic field. Wave plates 67 and 68 are also positioned in parallel with resect to the light path. A Faraday rotator 61 is positioned adjacent the wave plates 67 and 68, and a magnet 62 applies an external magnetic field to the Faraday rotator 61. A birefringent block 41 is positioned in the middle of the optical circulator, so that the light passes through different optical paths depending on the direction of travel and the direction of polarization.

FIG. 26 illustrates another optical circulator disclosed in Japanese Patent No. 2539563. The optical circulator includes an optical collimator that includes optical fibers 12 and 14 fixedly mounted to Ferrules 11 and 20, respectively, and lenses 22 and 23, and another optical collimator that includes an optical fiber 82 fixedly mounted to a Ferrule 81 and a lens 72. There are provided two birefringent blocks 21 and 71 between the two optical collimators, the birefringent blocks branching a light beam into two optical paths or combining light beams into one optical path depending on the direction of travel and polarization direction of the light beam(s). Provided between the two birefringent blocks 21 and 71 are a pair of Faraday rotators 31 and 34 and a pair of Faraday rotators 61 and 64. The Faraday rotators 31 and 34 are positioned in parallel with respect to the light path. Permanent magnets 32 and 35 apply external magnetic fields to the pair of Faraday rotators 31 and 34 so that the polarization plane of the light passing through the Faraday rotators 31 and 34 is rotated by 45 degrees. The Faraday rotators 61 and 64 are positioned in parallel with respect to the light path. Permanent magnets 62 and 65 apply external magnetic fields to the pair of Faraday rotators 61 and 64 so that the polarization plane of the light passing through the Faraday rotators 61 and 64 is rotated by 45 degrees. A birefringent block 41 is positioned in the middle of the optical circulator, so that the light passes through different optical paths depending on the direction of travel and the direction of polarization of the light.

The optical circulator proposed in Japanese Patent No. 2539563 uses an optical collimator that is a combination of an optical fiber and a lens provided at each port. Therefore, individual optical components are of large sizes and therefore are not economical.

U.S. Pat. No. 5,991,076 in FIG. 27 and U.S. Pat. No. 6,049,426 in FIG. 28 propose miniaturized optical circulators in which the optical components can be small. In these optical circulators, a birefringent block 21 branches light emitted from an optical fiber 12 into two light beams having polarization planes perpendicular to each other, or combines two light beams having polarization planes perpendicular to each other into a single beam. A birefringent block 71 branches the light emitted from an optical fiber 82 into two light beams having polarization planes at right angles with each other, or combines two light beams having polarization planes perpendicular to each other into a single beam.

Referring to FIG. 27, a pair of wave plates 37–38, a pair of wave plates 67–68, and Faraday rotators 31 and 61 are arranged between two birefringent blocks 21 and 71. Each of the two pairs of wave plates 37–38 and 67–68 is positioned in parallel with respect to the light path and causes the light to be polarized in the same direction. Birefringent blocks 41 and 42 and lenses 51 and 52 are positioned symmetrically about the longitudinal middle of the optical circulator, so that the light passes through different light paths depending on the direction of travel of the light and the direction of polarization plane of the light.

The optical circulator in FIG. 27 allows optical fibers to be positioned irrespective of the shape of a lens, thus lending itself to the miniaturizing of optical circulators. However, the requirement of positioning wave plates in parallel with respect to the optical path places certain limitations on the miniaturization of optical circulators. Wave plates used in these optical devices usually have a size of about several millimeters square and are cut into desired sizes by means of, for example, a dicing saw. However, the use of a dicing saw causes chipping in the range of several microns to several tens microns at cut surfaces and edges of the wave plates. When light passes through the chipped portions, the optical characteristics of the wave plate deteriorate. Thus, it is required to ensure that light paths are separated by at least a certain distance in designing an optical circulator. This is a barrier to the miniaturization of circulators. In addition, the number of optical parts is 12, which is another factor behind increases in manufacturing cost.

FIG. 28 illustrates an optical circulator proposed in U.S. Pat. No. 6,049,426. This optical circulator includes two pairs of Faraday rotators, i.e., rotators 31 and 34 and rotators 61 and 64, which retain their magnetization and do not require permanent magnets. The Faraday rotators 31 and 34 are positioned in parallel with respect to the optical path. The Faraday rotators 61 and 64 are also positioned in parallel with respect to the optical path. Wollaston prisms 45 and 46 are used to form oblique light paths so that lenses 22 and 72 are shared by two light beams, thereby configuring an optical circulator in which miniaturized optical components can be used.

The optical circulator in FIG. 28 also requires two pairs of Faraday rotators, each pair including two Faraday rotators (31 and 34, or 61 and 64) aligned in parallel with respect to the light path. Therefore, the mechanical structure of the optical circulator necessarily places limitations on the miniaturization of an optical circulator. Moreover, the inventors has found that because a Faraday rotator is a ferrimagnetic material, when two Faraday rotators having opposite magnetization directions are positioned in contact with each other, the magnetic characteristics of the two Faraday rotators can affect each other to cause them to be demagnetized. Thus, the structure in FIG. 28 requires the two Faraday rotators to be somewhat spaced. This requirement implies that the light beams must further spaced apart.

In addition, the configuration in FIG. 28 can incorporate Faraday rotators only of the magnetization retaining type that requires no external magnetic field. The temperature and wavelength dependencies of Faraday rotation determine the performance of an optical device that uses a Faraday rotator. Commercially available Faraday rotators of the magnetization retaining type are prominently poor in temperature and wavelength dependencies as compared with ordinary Faraday rotators that are used in combination with magnets. Thus, optical circulators that employ Faraday rotators of the magnetization retaining type are inherently poor in temperature and wavelength dependencies as compared with optical circulators of other configuration.

The optical circulator in FIG. 28 incorporates a Wollaston prism formed of two birefringent blocks. The number of optical components is 12 and therefore it is essential to reduce the number of expensive optical components for lowering manufacturing costs.

In recent years, polarization dependent loss (PDL) has become an important characteristic of an optical device. PDL is a loss resulting from the difference in the polarization direction of light incident on an optical device. Optical devices including optical circulators, which utilize the polarization of light, are usually designed to have two light paths by using, for example, a birefringent block that branches the incident light into two light beams having polarization directions perpendicular to each other. When the two light beams travel in their corresponding paths, if the two beams transmit through different optical components, PDL results from differences in the insertion loss and characteristics of optical components. All of the aforementioned conventional optical circulators are of the configuration that optical components are aligned in parallel with respect to the light paths and therefore individual light beams pass through separate optical components. Such a configuration is apt to cause PDL inherently. Generally, variations in the insertion loss of a Faraday rotator are substantially in the range of a typical value ±0.02 dB. This implies that when light beams pass through a pair of optical components positioned in parallel in the light path, the light beams are subject to a PDL of a maximum of 0.04 dB.

Just as in optical circulators, there have also been proposed some configurations to polarization independent optical isolators. One such common apparatus is a combination of three birefringent blocks disclosed in Japanese Patents No. 58-28561 and No. 60-51690.

The polarization independent optical isolators disclosed in Japanese Patents No. 58-28561 and No. 60-51690 have a maximum isolation of about 40 dB, which is determined by the extinction ratio of the Faraday rotator. The Faraday rotation angle of a Faraday rotator depends on the temperature of the rotator and the wavelength of the light that passes the rotator. Therefore, changes in environmental temperature and laser wavelength cause serious deterioration of isolation. For high isolation, Japanese Patents No. 2539563 and 60-51690, 58-28561, and European Patent No. 0352002 have proposed, for example, the use of two polarization independent optical isolators positioned in series in the light path. This approach requires a large number of components and therefore uneconomical.

The inventors continued to research and study to develop a polarization independent optical isolator that has a small optical loss, can be assembled and adjusted easily, and requires a smaller number of components. As a result, the inventors proposed a configuration of a polarization independent optical isolator disclosed in U.S. Pat. No. 5,345,329. This polarization independent optical isolator has a feature of employing a double divided-domain Faraday rotator. The term double divided-domain Faraday rotator is used to cover a Faraday rotator that is made of a bismuth-substituted rare earth iron garnet single crystal film and is divided into two areas of a single domain structure when the Faraday rotator is in two external magnetic fields. When one of two adjacent areas of a Faraday rotator is placed in a magnetic field and the other of the adjacent areas is placed in another magnetic field, the two magnetic fields being opposite in direction, the two areas form magnetic domains having opposite magnetization directions. Thus, the two adjacent magnetic domains are bounded by an intermediate portion and exhibit Faraday rotations of opposite directions.

The configuration disclosed in U.S. Pat. No. 5,345,329 allows manufacture of a polarization independent optical isolator that requires a smaller number of components, can be assembled and adjusted easily, and is inherently free from PDL.

In practicing the configuration, the inventors used an ordinary optical collimator in which a lens is firmly attached to an end of an optical fiber. The diameter of commercially available lenses and optical collimators is 2 mm or larger. Because the beam diameter of collimated light is about 0.4 mm, the distance between light beams is 1.6 mm. Assuming that assembly margin is about 0.4 mm, it is only necessary for areas on a Faraday rotator 1 mm away from the boundary between two adjacent magnetic domains to function as double domains. However, in recent years, continuing miniaturization of optical components, development of lenses and optical collimators having small diameters, and development of dual-fiber Ferrules allow a single lens to be shared by light beams emitted from more than one optical fibers. This has led to miniaturized optical circulators as shown in FIGS. 27 and 28. The advent of such small optical devices has made it possible to design optical devices having a small distance between light beams and brought about the need for a reliable function of the inventors' double domain Faraday rotator when light beams are very closely spaced.

Optical circulators and optical isolators according to the present invention have a feature that light emitted from an optical fiber is branched by a birefringent block and then directed to a double divided-domain Faraday rotator. For example, when a birefringent block is made of a rutile single crystal, the distance $\Delta D_B$ between the light beams branched by the birefringent block is given by Equation (4) as follows:

$$\Delta D_B = \left\{ \frac{n_e^2 - n_0^2}{2n_e n_0} - \left( \frac{1}{n_0} + \frac{1}{n_e \cos(\sigma)} \right) \tan(\theta) \right\} \times L = 0.0215 \times L$$

where $n_e$ and $n_o$ are refraction indexes and L is a length of the birefringent block.

For commercially available rutile single crystals, $n_e$=2.452 and $n_o$=2.709 at a wavelength of 1550 nm. σ represents a separation angle by which the light is branched by the birefringent block and is calculated by $\tan(\sigma)=(n_e^2-n_o^2)/2/n_e/n_o$=0.0998. θ is calculated from a numerical aperture of a single mode optical fiber by NA=sin (θ). The numerical aperture of a single mode optical fiber is 0.1 and therefore the right side of Equation (4) is 0.0215L.

For a rutile single crystal, if the crystal is to be miniaturized such that the length of the crystal is half (i.e., about 4 mm) of a conventional length, then the distance between two light beams is 0.0215×4=0.083 mm. Taking assembly errors into account, it is sufficient to ensure that the two magnetic domains are not apart from each other by more than 0.083 mm and are adjacent to each other with a boundary area having a maximum width of 0.04 mm between the two magnetic domains. In other words, the narrower the boundary region of a double divided-domain Faraday rotator that does not function as a Faraday rotator, the smaller the birefringent block can be made. This implies that if the machining accuracy and assembly accuracy of the optical components can be improved further, a rutile single crystal having a length less than 1 mm can be used to configure very small optical circulators and optical isolators. Such optical circulators and optical isolators can work with light beams that are separated by less than 0.02 mm.

As described above, with the double divided-domain Faraday rotator proposed in U.S. Pat. No. 5,345,329, it is highly desirable that the isolator operates properly and can work with light beams spaced apart by a short distance. If a double domain rotator is to be configured by placing permanent magnets beside the Faraday rotator, an important factor is a rate of change in magnetic field (denoted by DH in this specification) of the permanent magnets. The rate of change in magnetic field of the permanent magnets is usually about 3 cm$^{-1}$. For example, when a commercially available Faraday rotator having a small saturation magnetic field (e.g., 300 Oe) is used, external magnetic fields of +300 Oe and −300 Oe are not strong enough to cause the Faraday rotator to saturate. This implies that if the permanent magnets have a residual flux density of 10000 Gauss, then a boundary area of about 0.2 mm wide cannot function normally as a Faraday rotator. Likewise, when a Faraday rotator having a saturation magnetic field of 650 Oe, which exhibits good temperature dependence, is employed, a boundary area of about 0.43 mm wide cannot function normally as a Faraday rotator. Assuming an assembly error of 0.1 mm, the distance between light beams must be at least 0.53 mm, which is too long a distance to meet the requirement that optical isolator can operate when the distance between the light beams is very short.

The inventors researched and studied a double divided-domain Faraday rotator to develop polarization independent optical isolators, optical circulators, and polarization beam combiners that do not require two optical components to be positioned in parallel with respect to the light path. Such isolators, circulators, and beam combiners can be miniaturized to their theoretical limitations, have an inexpensive configuration, require a smaller number of components, and is difficult to cause PDL. As a result of their research and study, the inventors made the present invention. The present invention is based on the concept of the double divided-domain Faraday rotator proposed by the inventions in U.S. Pat. No. 5,345,329. When a double divided-domain Faraday rotator is used to make smaller-size optical circulators and polarization beam combiners, it is necessary to solve some technical problems. The inventors solved the technical problems, thereby proposing optical devices such as optical circulators, optical isolators, and polarization beam combiners that use a Faraday rotator.

A first problem is that when light passes the boundary area between adjacent magnetic domains of a double divided-domain Faraday rotator, a required Faraday rotation of the light cannot be obtained. Therefore, the light path must be designed such that the light does not pass through the boundary area between the adjacent magnetic domains. It is relatively easy to design a boundary area having a width of about 1 mm. However, it is required to design the boundary area having a width less than 0.1 mm for further miniaturization of isolators, circulators, and beam combiners.

A second problem is the drawbacks associated with the use of an optical collimator. For an optical collimator that is a combination of an optical fiber and a lens, there is a limit to the miniaturization of the lens and therefore the collimator for polarization independent optical isolators, optical circulators, and polarization beam combiners cannot be smaller beyond a certain size. For example, when an optical component having a size of 1 mm forms one port of an optical isolator, if a multi port optical isolator is to be designed using a commercially available 1 mm-diameter lens, the size of the multi port isolator will increase by 1 mm for each additional port. As described above, a commercially available optical collimator usually produces parallel light having a diameter of about 400 μm. Thus, a birefringent block must branch light into two beams such that the center-to-center distance between the two beams is longer than 400 μm. Thus, the second problem is to design a collimator in which the size and performance of a lens are not obstacles to miniaturization of isolators, circulators, and beam combiners.

The inventors made considerable efforts to make a narrow boundary area between adjacent two magnetic domains of a Faraday rotator, thereby implementing optical circulators, optical isolators, and polarization beam combiners that are small, inexpensive, and suitable for developing a multi port device.

SUMMARY OF THE INVENTION

An object of the invention is to provide a miniaturized Faraday rotator useful for optical circulators, optical isolators, and polarization beam combiners that are small, require a small number of optical components, and have multiple ports.

Another object of the invention is to provide these optical devices at low cost on a commercial basis in a large quantity, thereby contributing to the implementation and proliferation of optical communications.

The invention is directed to an optical device includes a Faraday rotator made of a bismuth substituted rare earth iron garnet single crystal film having a Faraday rotation of 45 degrees, and permanent magnets arranged beside the Faraday rotator to define two or more than two areas of a single domain structure in the Faraday rotator. Adjacent areas are magnetized in opposite directions to cause polarization planes of light beams passing through the adjacent areas to rotate in opposite directions. The optical device satisfies in the relation expressed by equation (1)

$$Hs/Br/DH > \Delta D/2 > 0 \qquad (1)$$

where Hs (Oe) is a saturation magnetic field of the bismuth substituted rare earth iron garnet single crystal film, DH (cm$^{-1}$) is a rate of change in magnetic field in the proximity to a boundary between the adjacent areas, Br (Gauss) is a residual flux density of the permanent magnets, and ΔD is a distance between the two light beams.

The Faraday rotator and the permanent magnets are in the relation expressed by equation (2)

$$(Dw*/H*)/(1/Br/DH) \qquad (2)$$

where H* is a lower limit of the magnetic field at which a width of a magnetic domain in a peripheral portion of the Faraday rotator starts to change more rapidly than a width of a magnetic domain in a middle portion of the Faraday rotator, and Dw* is a width of magnetic domain when the magnetic field is H*.

The Faraday rotator and permanent magnets are in the relation expressed by equation (3)

$$-0.0000172 Hs + 0.0312 > (Hs/Br/DH) \quad (3)$$

The permanent magnets include two permanent magnets arranged with the Faraday rotator positioned therebetween. Each of the two permanent magnets has a residual magnetic flux density Br in the range of 9000 to 12000 (Gauss). The two permanent magnets are spaced apart by a distance in the range of 0.08 to 0.18 (cm) so that DH is in the range of 2 to 5 (cm$^{-1}$). ΔD is in the range of 0.005 to 0.05 (cm). The Faraday rotator has a saturation magnetic field equal to or less than 750 (Oe).

The permanent magnets may include at least three permanent magnets each of which has a residual magnetic flux density Br in the range of 9000 to 12000 (Gauss). The at least three magnets are aligned beside at least one side of the Faraday rotator at intervals in the range of 0.06 to 0.10 (cm) so that DH is in the range of 0.7 to 1.2 (cm$^{-1}$). ΔD is in the range of 0.005 to 0.05 (cm) and the Faraday rotator has a saturation magnetic field equal to or less than 300 (Oe).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DESCRIPTION OF THE INVENTION

Embodiments of the invention will be described in detail by way of experimental results with reference to the drawings.

In this specification, the term multiple divided-domain Faraday rotator is used to cover a Faraday rotator that is made of a bismuth-substituted rare earth iron garnet single crystal film and is divided into multiple areas of a single domain structure when the Faraday rotator is in a plurality of external magnetic fields.

Figure 1A:
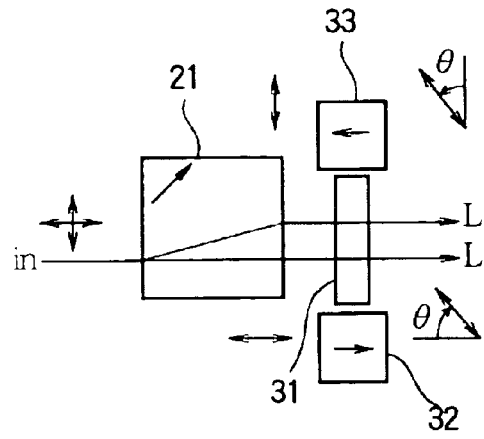
FIGS. 1A–1C illustrate the principle operation of a Faraday rotator (referred to as double divided-domain Faraday rotator) according to the invention.
Figure 1B:
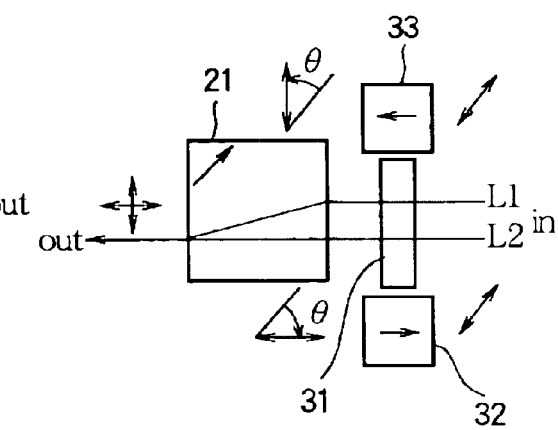
Figure 1C:
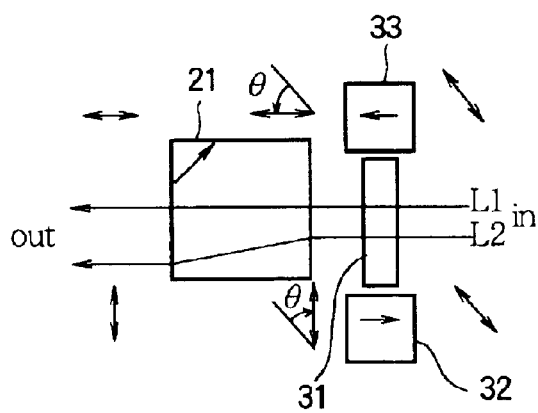

FIGS. 1A–1C illustrate the principle of operation of an optical apparatus that uses a Faraday rotator (referred to as a double divided-domain Faraday rotator) according to the invention.

The optical device according to the invention includes a Faraday rotator made of a bismuth substituted rare-earth iron garnet single crystal (BIG) 31 having a Faraday rotation of about 45 degrees, permanent magnets 32 and 33 arranged relative to the Faraday rotator, and a birefringent block 21. The magnetic fields of the permanent magnets 32 and 33 divide the Faraday rotator into two regions (i.e., two single domains), where the light passing through the two regions experience a Faraday rotation in opposite directions. The birefringent block 21 splits an incident light beam into two light beams which are subsequently incident on the double divided-domain Faraday rotator (FIG. 1A) or combines two light beams emitted from the double divided-domain Faraday rotator into a single beam (FIG. 1B). The arrow on the birefringent block 21 represents the optic axis of the birefringent block 21. The arrows on the permanent magnets 32 and 33 represent their magnetization directions. Symbols having arrows at both ends indicate the polarization direction of the light beams. As shown in FIG. 1A, light incident on the birefringent block 21 is branched into two light beams, which travel in path L1 (extraordinary ray) and path L2 (ordinary ray), respectively, through corresponding domains of the double divided-domain Faraday rotator. The polarization planes of the two beams rotate by 45 degrees in opposite directions, so that when the two beams exit the double divided-domain Faraday rotator, the polarization planes of the beams are oriented in the same direction.

FIG. 1B illustrates light beams traveling in the opposite directions to FIG. 1A.

Referring to FIG. 1B, the light beams entering the light paths L1 and L2 have polarization planes perpendicular to those of the light beams exiting the double divided-domain Faraday rotator 31 in FIG. 1A. Shortly after the light beams have passed through the Faraday rotator 31, the light passing through the path L1 has the same polarization direction as the extraordinary ray in FIG. 1A, and the light passing through the path L2 has the same polarization direction as the ordinary ray in FIG. 1A, so that the extraordinary ray in the path L1 combines with the ordinary ray in the path L2 at the exit of the birefringent block 21 to form a single beam, which is emitted from the birefringent block 21.

Referring to FIG. 1C, the light beams entering the paths L1 and L2 have polarization directions perpendicular to the light beams entering the paths L1 and L2 in FIG. 1B. The light beams exiting the birefringent block 21 have polarization planes perpendicular to each other, so that when the light beams exit the birefringent block 21, the light beam passing through the path L1 has a polarization plane perpendicular to that of the extraordinary ray in FIG. 1A, and the light beam passing through the path L2 has a polarization plane perpendicular to that of the ordinary ray in FIG. 1A.

Figure 2A:
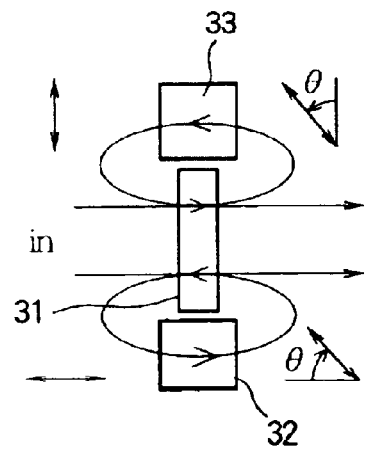
FIG. 2A illustrates the ordinary ray and extraordinary ray when they pass through the double divided-domain Faraday rotator.
Figure 2B:
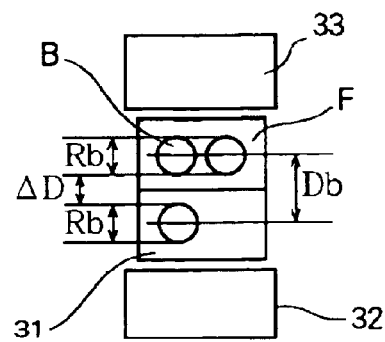
FIG. 2B is a front view of FIG. 2A and illustrates the positional relationship between the beam diameter and the distance between the two beams.

FIG. 2A illustrates the ordinary ray and extraordinary ray when they pass through the double divided-domain Faraday rotator 31. Referring to FIG. 2A, elliptic lines passing through the permanent magnets 32 and 33 and the double divided-domain Faraday rotator 31 represent the directions of the magnetic fluxes of the magnets 32 and 33. It is assumed that the light beams entering the paths L1 and L2 have polarization planes at 90 degrees with each other. The light in the path L1 passes one of two magnetic domains so that the polarization plane of the light is rotated leftward by an angle θ. The light in the path L2 passes the other of the two magnetic domains so that the polarization plane of the light is rotated rightward by an angle θ. FIG. 2B is a front view of FIG. 2A and illustrates the positional relationship between the beam diameter and the distance between the two beams. Rb denotes the beam diameter of the light beams, Db denotes the center-to-center distance between the two beams, and ΔD is the distance between the beams. The line passing through the center of the double divided-domain Faraday rotator 31 denotes a boundary where the magnetic fields of the permanent magnets 31 and 32 cancel out each other.

Figure 3:
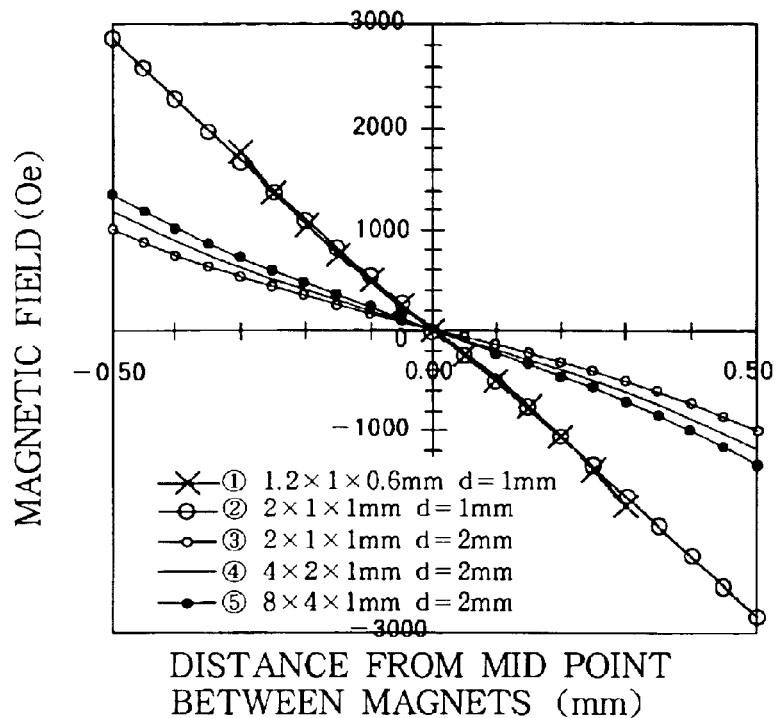
FIG. 3 illustrates the calculation of a magnetic field developed between two magnets positioned such that the magnetic fields of the magnets are opposite in direction.

FIG. 3 illustrates the calculation of a magnetic field developed between two magnets positioned such that the magnetic fields of the magnets are opposite in direction. Each of the two permanent magnets has a residual magnetic flux density, Br, of 10,000 Gauss. When the strength of a magnetic field applied to the bismuth substituted rare-earth iron garnet single crystal film varies along the distance from the boundary, if an area on the Faraday rotator is exposed to a sufficient magnetic field strength, the area is readily considered to be sufficiently magnetized. The width of the boundary between two magnetic domains having opposite magnetization directions decreases when the magnetic field strength changes rapidly along the distance from the boundary. For the purpose of accurately defining the change in magnetic field determined by the shape and arrangement of magnets, the inventors defined a rate of change in magnetic field, DH, i.e., a change in magnetic field per unit distance (cm) from the boundary between the two magnetic domains divided by the residual magnetic flux density, Br.

For example, for Case ① in FIG. 3, each permanent magnet has a dimension of 1.2×1×0.6 mm (Width×Height× Thickness) and the distance d between the two permanent magnets is 1 mm.

Figure 4:
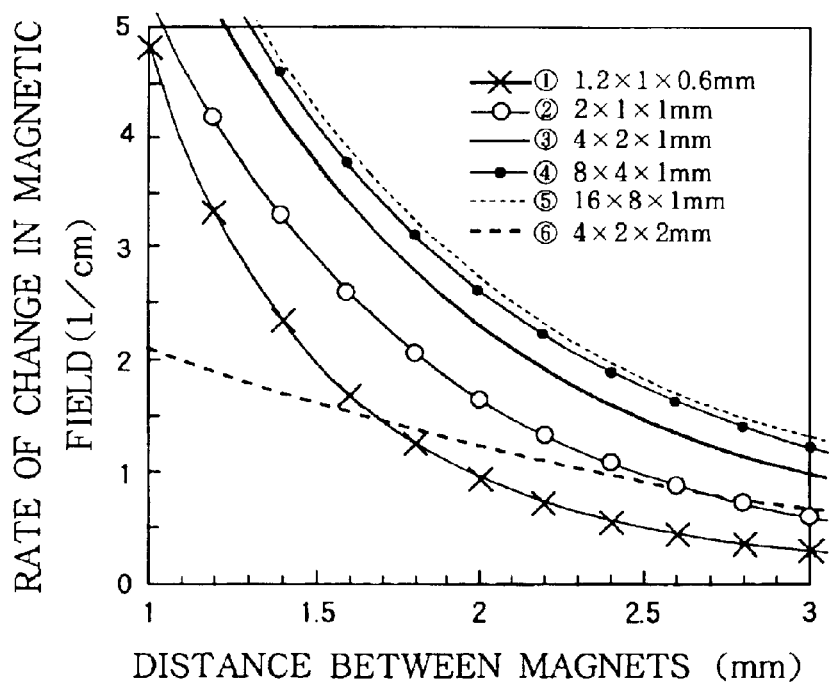
FIG. 4 plots DH as a function of the distance between the two permanent magnets, calculated for different magnets having various dimensions.

FIG. 4 plots DH as a function of the distance between the two permanent magnets, calculated for different magnets having various dimensions. For the commonly used permanent magnets and their arrangement, the calculation revealed that the DH is in the range of 2 to 5 $cm^{-1}$. As is clear from calculations ③ and ⑥, thin magnets cause large values of DH. In the present invention, a thickness of 0.6 mm is a lower limit of the thickness of a magnet that can be manufactured. The value of DH increases with increasing size of the magnet but there is a limit to the increase of DH. Considering the aforementioned factors, a permanent magnet having a size of 2×1×1 mm or 1.2×1×0.6 mm is used in the present invention.

From the aforementioned DH and Br of permanent magnets, the width of an area near the boundary can be readily calculated in which the magnetic field is not strong enough to magnetically saturate a BIG. In other words, the width of the area is twice the saturation magnetic field Hs of the BIG film divided by both DH and residual magnetic flux density Br, i.e., 2×(Hs/DH/Br).

It is considered that when an area of a Faraday rotator is placed in an insufficient magnetic field, the area has a multi domain structure. Thus, it is considered that when light passes through such an area in an insufficient magnetic field, the full performance of the single crystal film cannot be obtained. Thus, the distance ΔD between light paths (FIG. 2) requires to be longer than the width of a boundary area in which the magnetic field strength is not sufficient.

However, the inventors of the present invention discovered the fact that the BIG has single domains clearly bounded only by a magnetic wall even though the field strength of the external magnetic field applied to the area near the boundary is insufficient.

One such double divided-domain Faraday rotator is configured by arranging permanent magnets having a residual magnetic flux density Br of 10,000 Gauss around a bismuth-substituted iron garnet single crystal film (referred to G-film 1 here) for a wavelength of 1550 nm (referred to as G1-film herein after) so that DH is 3.3 cm$^{-1}$, the G-film 1 having a size of 1.3 mm square, a composition of (TbBi)(FeGa)G, a magnetic domain width of 30 μm, and a saturation magnetic field of 635 Oe. With this condition, the G-film 1 is not magnetically saturated over a distance Hs/Br/DH=0.0192 cm from the boundary. Therefore, one might consider that the area over the distance Hs/Br/DH=0.0192 cm from the boundary has a multi domain structure. In reality, there is no multi domain in the area, rather the Faraday rotator has two single domains clearly bounded only by a magnetic wall and acts as a double divided-domain Faraday rotator as a whole. The inventors call this Case I.

When the magnets are arranged around the same Faraday rotator so that the DH is 2.8 cm$^{-1}$, the G-film 1 is not magnetically saturated over a distance of Hs/Br/DH=0.022 mm from the boundary. In this case, the Faraday rotator is not divided into two single domains bounded only by a magnetic wall but has an area of a multi domain structure over a distance of 0.011 cm from the boundary. The inventors call this Case II.

Figure 5:
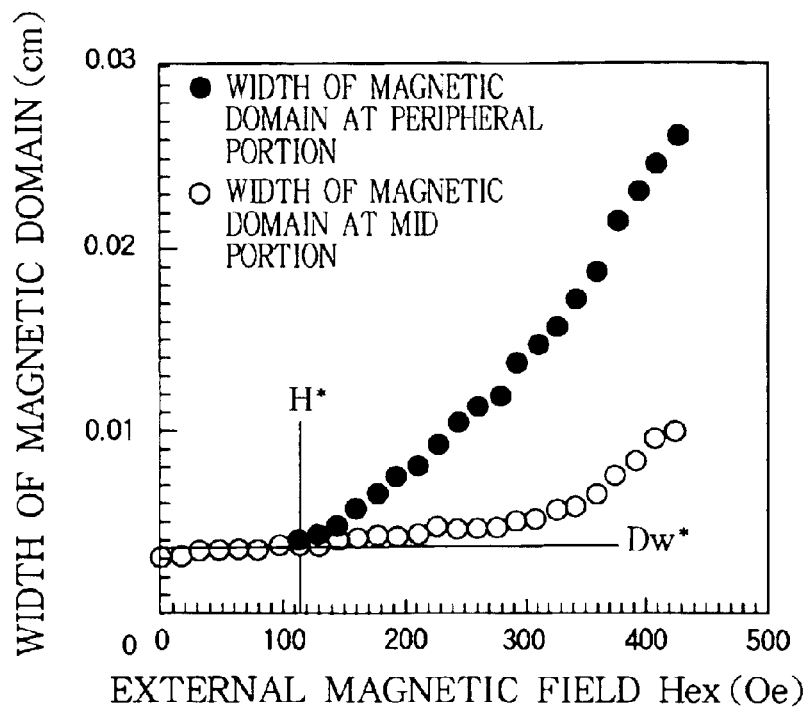
FIG. 5 illustrates the relationship between the width of individual magnetic domains and an external magnetic field when the external magnetic field is applied to the G-film 1.

The inventors applied a uniform external magnetic field to the aforementioned Faraday rotator and observed the behavior of the magnetic domains, thereby interpreting Case I and Case II as follows:

FIG. 5 illustrates the relationship between the width of individual magnetic domains and an external magnetic field when the external magnetic field is applied to the G-film 1. Symbol ○ denotes the relationship between the width of individual magnetic domains and the external magnetic field in the same direction as the magnetization of the magnetic domains, showing the relationship at the middle portion of the G-film 1. Symbol ● denotes the relationship between the width of magnetic domains and the external magnetic field in the same direction as the magnetization of the magnetic domains, showing the relationship at the peripheral portion of the G-film 1. FIG. 5 shows the width of individual magnetic domains having magnetization oriented in the same direction as the applied external magnetic field. With increasing external magnetic field, the magnetic domains in the middle of the film generally remain a multi domain structure with a small, gradual increase in size, while the magnetic domains in the peripheral portion surrounding the multi domain structure start to increase in size beyond certain field strength. When the external magnetic field is increased further, the width of magnetic domains in the peripheral portion increases at a much higher rate than in the middle portion. The inventors defined an external magnetic field as H* at which the width of magnetic domains in the peripheral portion starts to increase at a much higher rate than in the middle portion, and the width of magnetic domain at the external magnetic field H* as Dw*.

Figure 6:
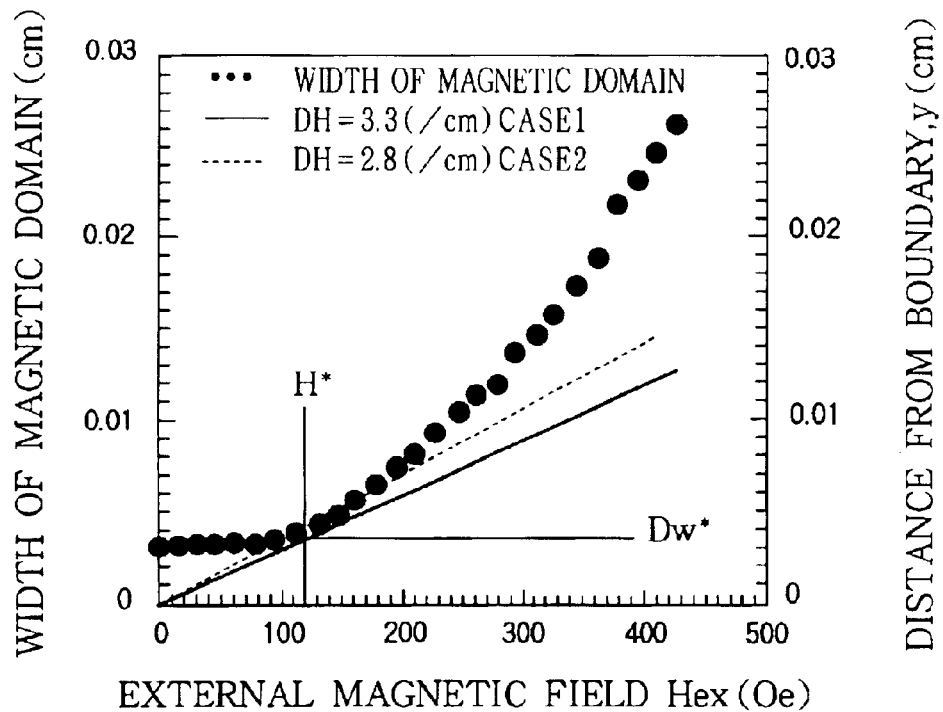
FIG. 6 illustrates the relationship between the width (denoted by) of magnetic domain and the external magnetic field Hex for Case I (solid line) and Case II (dotted line)

FIG. 6 illustrates the relationship between the width (denoted by ●) of magnetic domain and the external magnetic field Hex for Case I (solid line) and Case II (dotted line). The external magnetic field Hex at a distance y from the boundary is given in terms of DH and Br as follows:

$$Hex = Br \times DH \times y \qquad (5)$$

The value of DH is 3.3 cm$^{-1}$ for Case I and 2.8 cm$^{-1}$ for case II. FIG. 6 shows the values of DH and y for Case I and Case II, respectively, when Br is 10,000 Gauss.

Considering the behavior of the boundary (i.e., magnetic walls) between adjacent magnetic domains, the inventors analyzed Case I and Case II as follows: It is important that FIG. 6 plots the width of magnetic domain and the distance y on the same scale.

Usually, when an external magnetic field Hex is applied to a Faraday rotator, the magnetic walls of the Faraday rotator move in the following manner. That is, the magnetic domains having the same magnetization direction as the external magnetic field Hex increase in size while the magnetic domains having the magnetization direction opposite to the external magnetic field Hex decrease in size. In other words, depending on the strength of an external magnetic field, the magnetic walls move toward locations where magnetic domains become stable. For double divided-domain Faraday rotators and multiple divided-domain Faraday rotators, the strength of each one of adjacent external magnetic fields Hex varies continuously with the distance from the boundary where the adjacent magnetic fields cancel out. In an area between the boundary and a point corresponding to Hs/Br/DH, the magnetic field strength is not sufficient for the Faraday rotator to magnetically saturate. One commonly held view is that the external magnetic field Hex decreases in strength with decreasing distance from the boundary formed in the middle of the Faraday rotator and therefore the magnetic walls should be located at a certain distance from the boundary.

However, the magnetic field of certain strength exists at that location and therefore the magnetic walls move further toward the boundary. If the aforementioned condition is maintained as far as the boundary, the magnetic walls can exist only in the boundary, so that adjacent single domains are bounded only by a magnetic wall without a multi domain structure formed between the single domains. In other words, the external magnetic field in this case fulfills a condition where neither the BIG can be magnetically saturated nor can multi domains exist. This is the aforementioned Case I. The inventors presumed that this condition near the boundary is equivalent to the condition at the peripheral portion observed in FIG. 5 and the width (denoted at ●) of domains at the peripheral portion behaves in the same manner as the width of domains formed in the double divided-domain Faraday rotator. From this presumption, in order for a Faraday rotator to have adjacent single domains bounded only by a magnetic wall, the curve of the width of magnetic domain in FIG. 6 is required to lie above the straight line of the distance y from the boundary as in Case I.

For Case II, the curve of the width of magnetic domain crosses the straight line of the distance y from the boundary near H*. Thus, the inventors considered that the presence of magnetic walls creates a stable condition in which the two single magnetic domains are not bounded only by a magnetic wall but exist with a multi domain structure lying between the two single magnetic domains.

Figure 7:
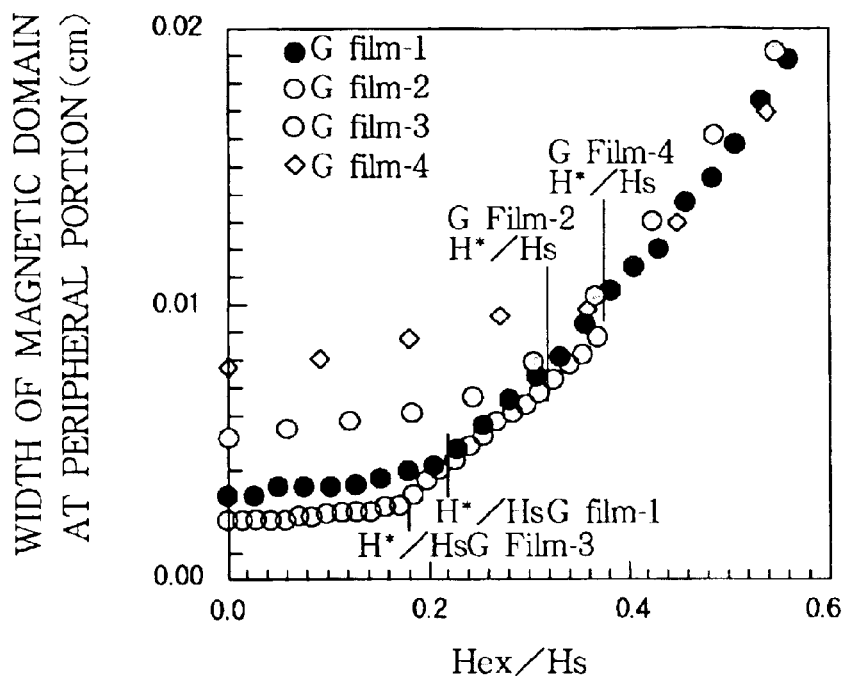
FIG. 7 plots changes in the width of magnetic domain against the external magnetic field Hex normalized with the saturation magnetic field Hs, for BIG films G-film 1 to G-film 4 having different compositions.

It is to be noted that the width of magnetic domain increases rapidly when the external magnetic field Hex increases beyond H*. Thus, the condition that the curve of the width of magnetic domain is always above the straight line of the distance y from the boundary is equivalent to the condition that the value of Dw*/H* is greater than the slope 1/Br/DH of the straight line of the distance from the boundary. This implies that there is a critical condition of Dw*/H*>1/Br/DH in order for a Faraday rotator to have two domains bounded only by a magnetic wall. The value of Dw*/H* will be investigated as follows:

FIG. 7 plots changes in the width of magnetic domain against the external magnetic field Hex normalized with the saturation magnetic field Hs, for BIG films G-film 1 to G-film 4 having different compositions.

G-film 1 has a composition (TbBi)(FeGa)G, which is the same composition as Case 1 and Case 2. G-film 2 has a composition (TbBi)(FeAlGa)G, G-film 3 has a composition (HoTbBi)(Fe)G, and G4-film has a composition (GdYBi)(FeGa)G. G-film 3 to G-film 4 have saturation magnetic fields of 635 Oe, 265 Oe, 1149 Oe, and 90 Oe, respectively. Both G-film 2 and G-film 4 can have adjacent single magnetic domains bounded only by a magnetic wall under the same magnetic conditions (Br=10000 Gauss, DH=3.3 cm$^{-1}$ and 2.8 cm$^{-1}$) as Case I and Case II. G-film 3 has a multi domain structure between the two single magnetic domains, that is, G-film 3 cannot have adjacent single magnetic domains bounded only by a magnetic wall but have a multi domain structure formed between the adjacent single magnetic domains.

FIG. 7 reveals that the plots for BIGs having different compositions lie on substantially the same curve when the magnetic field strength is greater than H*. This suggests that when the external magnetic field strength is greater than H*, there is a certain relation between the width of magnetic domain and the external magnetic field strength normalized with the saturation magnetic field, i.e., Hex/Hs, irrespective of the composition of BIG. Strictly speaking, the plots should lie on slightly different curves depending on the thickness and saturation magnetic field of the Faraday rotator. However, the results of analysis lied accurately on a straight line as shown in FIG. 7. Because H*/Hs is a parameter indicative of a lower limit on the same curve, there is also a certain relationship between H*/Hs and Dw*. H* and Dw* of the respective G-films can be determined in the same manner as shown in FIG. 5.

Figure 8:
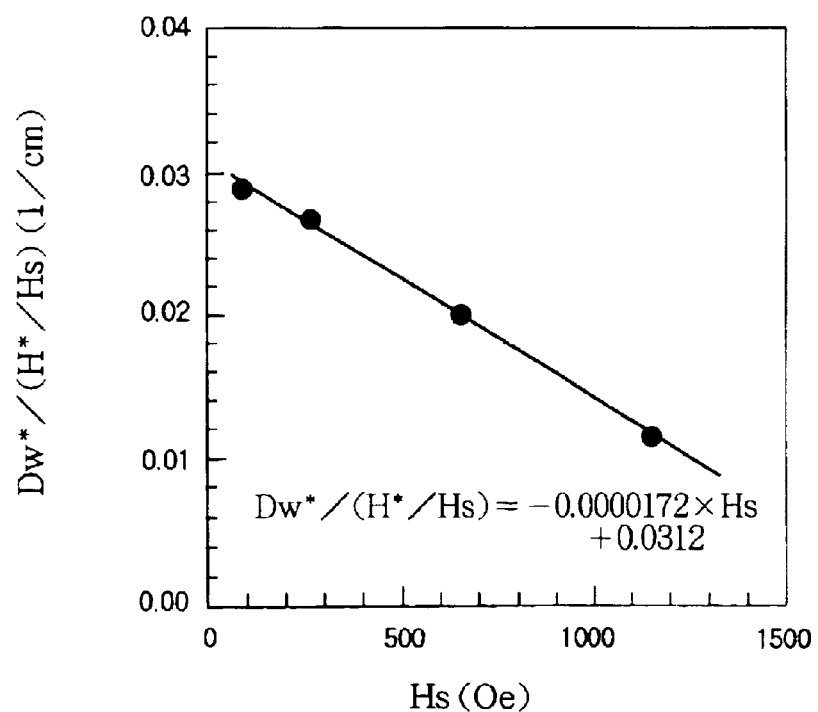
FIG. 8 illustrates the relations between saturation magnetic field Hs and Dw*/H*/Hs of G-film 1 to G-film 4.

FIG. 8 illustrates the relations between saturation magnetic field Hs and (Dw*/(H*/Hs)) of G1-film to G-film 4. The data in FIG. 8 reveals that in order to obtain a boundary defined only by a magnetic wall, it is necessary to fulfill the requirement that the curve of the width of magnetic domain lies always above the straight line representative of the distance from the boundary. This is equivalent to saying that the requirement that Dw*/H* is greater than the slope 1/Br/DH of the straight line that represents the relation between the magnetic field and the distance from the boundary. This relation between Dw*/H* and 1/Br/DH can be expressed as follows:

$$Dw*/H* > (1/Br/DH) \qquad (2)$$

By multiplying the left and right sides of Eq. (2) by the saturation magnetic field Hs, Eq. (6) can be obtained as follows:

$$(Dw*/H*)Hs = (Dw*/(H*/Hs)) > Hs/Br/DH \qquad (6)$$

By using the data in FIG. 8, (Dw*/(H*/Hs)) of Eq. (6) can be rewritten (developed) as a linear expression in terms of Hs, obtaining Eq. (3) as follows:

$$-0.0000172Hs + 0.0312 > (Hs/Br/DH) \qquad (3)$$

In other words, when magnets and a BIG having a saturation magnetic field Hs are arranged to satisfy Eq. (3), the Faraday rotator has two single domains bounded only by a magnetic wall.

In the experiment, measurement of the width of magnetic domain and saturation magnetic field was made on a BIG material that has a size of 11 mm square and a thickness that provides a 45-degree Faraday rotation at a wavelength of 1550 nm. Strictly speaking, the left side of Eq. (3) varies slightly depending on the film thickness and size of the BIG. For example, there is a tendency that the width of magnetic domain of the BIG is large if the ratio of the size to the thickness, or size-to-thickness ratio is small. Thus, the left side of Eq. (3) tends to be slightly large. However, this implies that smaller BIGs are stable as a double divided-domain Faraday rotator. A small size-to-thickness ratio causes a large measurement error of saturation magnetic field. This is why a 11 mm square BIG was used which provides a large size-to-thickness ratio.

With the aforementioned knowledge, the inventors have derived the following relation. When two separate light beams transmit through a double divided-domain Faraday rotator, half the distance ΔD between the two separate light beams must satisfy Eq. (1).

$$Hs/Br/DH > \Delta D/2 > 0 \qquad (1)$$

where Hs (Oe) is the saturation magnetic field of the BIG, Br (Gauss) is the residual magnetic flux density of permanent magnets used for reversing the magnetization direction of the BIG, and DH cm$^{-1}$ is the rate of change in magnetic field dependent on the arrangement of the permanent magnets. The distance ΔD (cm) between the two light beams that pass through the single domains is greater than zero, i.e., ΔD>0. With the requirement of satisfying Eq. (1), if a double divided-domain Faraday rotator having a large DH is designed by using a BIG having a small saturation magnetic field Hs, the distance Δ D can be short, thereby enabling miniaturizing the associated optical components.

A double divided-domain Faraday rotator can be formed by arranging permanent magnets and a BIG having a saturation magnetic field Hs in such a way that Eq. (2) and Eq. (3) are satisfied. Such a double divided-domain Faraday rotator can work with light beams spaced apart by a short distance ΔD, which is very close to zero. Such a double divided-domain Faraday rotator lends itself to the miniaturizing of optical devices.

With BIGs used as a double divided-domain Faraday rotator according to the present invention, the smaller the saturation magnetic field Hs of the BIG is, the more easily the double divided-domain Faraday rotator can be made.

A BIG grown in a liquid phase epitaxial (LPE) method has an easy axis perpendicular to the major surface of the BIG and a magnetic anisotropy Ku associated with the LPE method. It is known that the magnitude and direction of magnetic anisotropy Ku vary depending on the types and combinations of rare earth ions that are compositions of the BIG.

In the present invention, because of the shape of permanent magnets, the magnetic fields produced by the magnets are oblique to the major surface of the Faraday rotator. However, due to the magnetic anisotropy Ku, the BIG grown by the LPE method is affected not by components of the external magnetic field oblique to the major surface but by components of the external magnetic field perpendicular to the major surface. Thus, a BIG having an easy axis perpendicular to the major surface and a large magnetic anisotropy Ku can advantageously be used in the present invention.

It is known that the magnetic anisotropy of BIGs grown by the LPE method can be reduced by thermal treatment. Such a BIG whose magnetic anisotropy has been reduced by thermal treatment is not suitable for an optical device of the present invention.

Generally speaking, the saturation magnetic field Hs of a BIG can be reduced by substituting part of iron sites for non-magnetic ions such as Ga and Al. However, substituting iron sites for non-magnetic ions such as Ga and Al causes the following problems:

(1) The temperature dependence of Faraday rotation increases; and (2) A magnetic compensation temperature falls in a temperature range in which the BIG is used, so that the Faraday rotation at temperatures below the compensation temperature is of opposite sense from the rotation above the compensation temperature.

In the past, the inventors invented BIGs suitable for a Faraday rotator. One such BIG has a composition (GdRBi)(FeGaAl)G (where R is at least one selected from the group consisting of Y, Yb, and Lu) that has a compensation temperature lower than $-30°$ C. and a saturation magnetic field Hs equal to or lower than 160 Oe (Japanese Patent Laid-Open No. 7-315995, U.S. Pat. No. 5,512,193). Another BIG invented by the inventors has a composition (TbBi)(FeGa)G that has a larger saturation magnetic field Hs than the composition (GdRBi)(FeGaAl) but a compensation temperature lower than $-40°$ C. and an excellent temperature characteristic of Faraday rotation (Japanese Patent Laid-Open No. 11-1394, U.S. Pat. No. 6,031,645).

Figure 9:
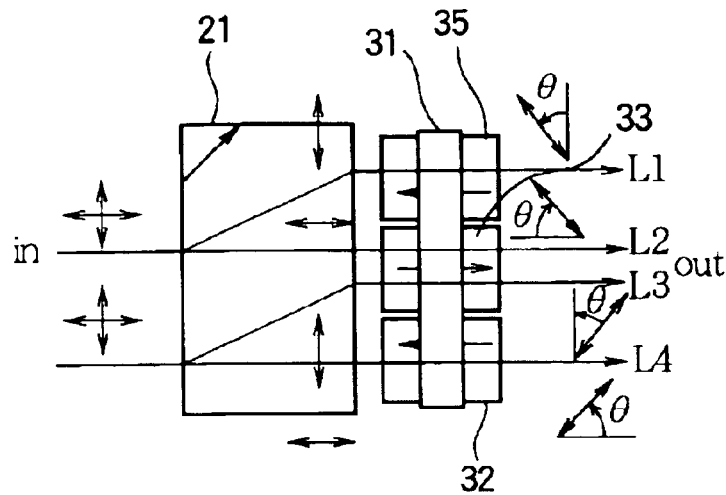
FIG. 9 shows an optical element of the invention, illustrating an example having more than two, say three single magnetic domains.

FIG. 9 shows an optical element of the invention, illustrating an example having more than two, say three single magnetic domains. This optical element is referred to as a multiple divided-domain Faraday rotator in this specification. The Faraday rotator in FIG. 9 has a Faraday rotation of $45°$ C. FIG. 9 illustrates a configuration in which permanent magnets are arranged beside a BIG such that adjacent magnets are opposite in polarity. A permanent magnet 35 applies a magnetic field to an optical path L1, the magnetic field being oriented in the direction of travel of light. A permanent magnet 33 applies a magnetic field to optical paths L2 and L3, the magnetic field being oriented in a direction opposite to the direction of travel of light. A permanent magnet 32 applies a magnetic field to an optical path L4, the magnetic field being oriented in the direction of travel of light. Arrows added to the respective magnets indicate the directions of magnetic fields. While the permanent magnets 32, 33, and 35 are positioned on one side of the BIG remote from the reader, additional similar permanent magnets may be arranged on the side of the BIG near the reader so that a stronger magnetic field can be applied to the BIG. Symbols having arrows at both ends indicate the direction of polarization plane of the light.

When the light passes through the birefringent block 21, the light is split into two light paths L1 and L2. The light beams passing through the light paths L1 and L2 have polarization planes perpendicular to each other. The light beams passing through the light paths L3 and L4 have polarization planes perpendicular to each other. The light beam in the light path L1 passes through an upper region of the multiple divided-domain Faraday rotator 31 so that the polarization plane is rotated by an angle θ leftward while the light beam in the light path L4 passes through a lower region of the multiple divided-domain Faraday rotator 31 so that the polarization plane is rotated by an angle θ leftward. The light beams in the light paths L2 and L3 pass through a middle region of the multiple divided-domain Faraday rotator 31 so that their polarization planes are rotated by an angle θ rightward.

Figure 10:
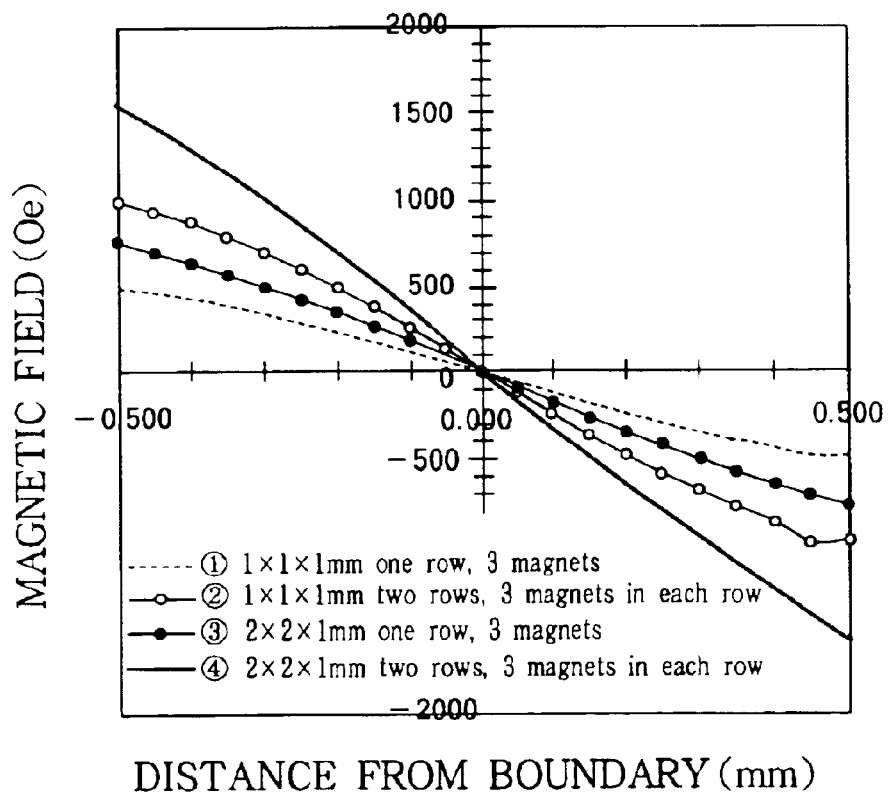
FIG. 10 illustrates the relationship between the magnetic field and the distance from the boundary between the magnetic domains when magnets are arranged beside the Faraday rotator.
Figure 11:
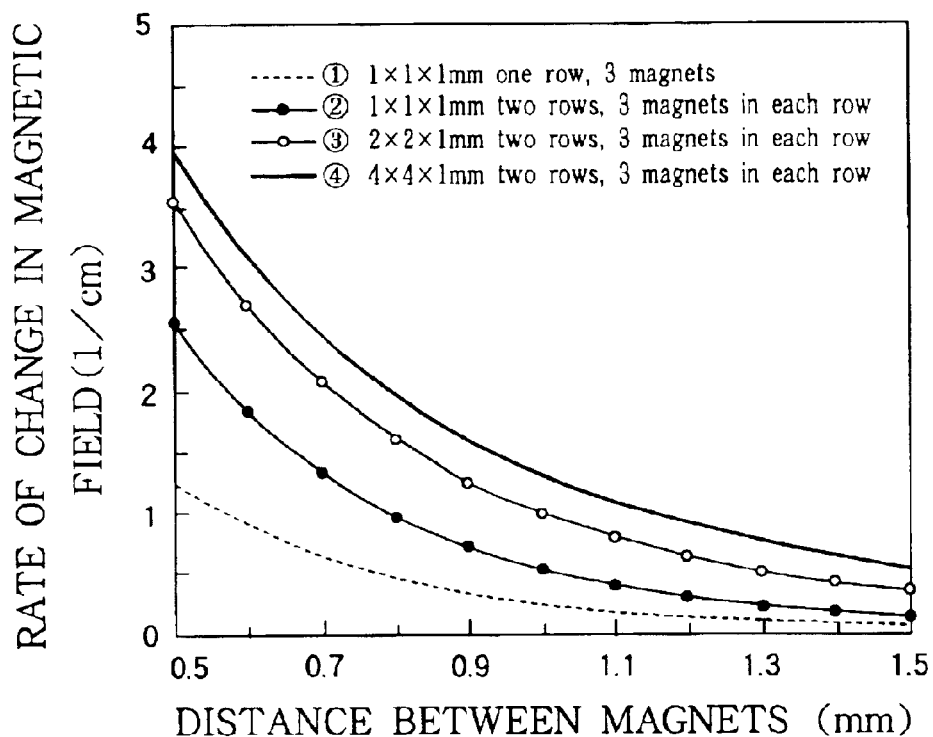
FIG. 11 illustrates the relationship between the rate of change in magnetic field and the distance between the permanent magnets aligned in a row when magnets are arranged beside the Faraday rotator.

FIGS. 10 and 11 illustrate the change in magnetic field and the rate of change in magnetic field, respectively, when three magnets are aligned in a row and when six magnets are aligned in two rows (three magnets in each row).

When three magnets are aligned in a row, calculation was made for field strengths and the rates of change of field strength at points on a line parallel to and 0.5 mm away from the row of the magnets.

When six magnets are aligned in two rows, three magnets are aligned in each row with the Faraday rotator positioned between the two rows. The two rows are spaced apart by 1 mm. Calculation was made for changes in magnetic fields and the rates of change in magnetic field at a point midway between the two rows and in the vicinity of the boundary between the magnetic domains (i.e., 0.5 mm from the row). The resulting rate of change in magnetic field is in the range of 0.5 to 3 cm$^{-1}$. Three permanent magnets were in the shape of a rectangular solid having a dimension of 1×1×1 mm were used. As shown in a dotted curve in FIG. 11, the rate of change in magnetic field, DH is in the range of 0.7 to 1.2 cm$^{-1}$ for distances between magnets in the range of 0.5 to 0.7 mm.

Using the above-described knowledge, the following optical device can be made. The distance ΔD between the light beams is selected to be in the range of 0.005 to 0.05 cm. The Faraday rotator is made of a BIG having a saturation magnetic field Hs of less than 300 Oe. The DH is set to 0.7 to 1.2 cm$^{-1}$ by arranging three permanent magnets having Br in the range of 9000 to 12000 Gauss at intervals of from 0.06 to 0.10 cm.

As described later, just as in the case of a double domain rotator, the use of a multiple divided-domain Faraday rotator makes it possible to construct a multi-port optical device and a composite optical device having different functions.

Specific examples to which the present invention is applied will now be described.

Core optical components including a Faraday rotator are bonded together using an optical adhesive, and then the bonded structure is sliced into chips of a desired size. Arranging permanent magnets beside a Faraday rotator to satisfy Eq. (1), Eq. (2), or Eq. (3) implements an inexpensive optical device.

Figure 12:
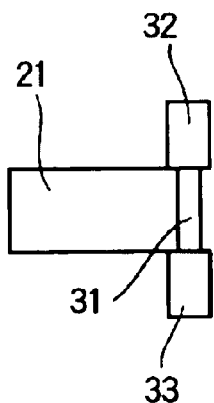
FIG. 12 illustrates a core chip of a polarization beam combiner according to the invention.

FIG. 12 illustrates a core chip of a polarization beam combiner according to the invention. First, the birefringent block 21 and the Faraday rotator 31 are firmly bonded together. Then, the bonded structure is sliced into chips of a desired size. The permanent magnets 32 and 33 are arranged beside each chip.

Figure 13:
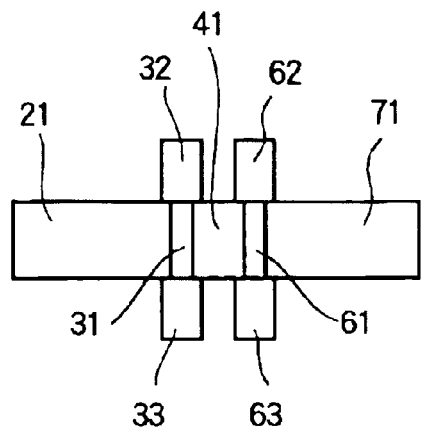
FIG. 13 illustrates an example of a core chip of an optical circulator according to the present invention.

FIG. 13 illustrates an example of a core chip of an optical circulator according to the present invention. A first birefringent block 21, a first Faraday rotator 31, a second birefringent block 41, a second Faraday rotator 61, and a third birefringent block 71 are aligned in this order and bonded together using an optical adhesive. Then, the bonded structure is sliced into chips having a desired size. Permanent magnets 32, 33, 62, and 63 are arranged beside each chip.

Figure 14:
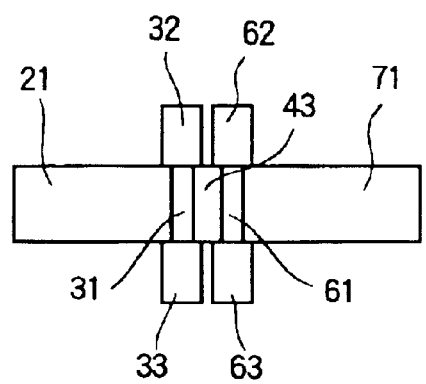
FIG. 14 illustrates an example of a core chip of a polarization independent optical isolator.
Figure 15:
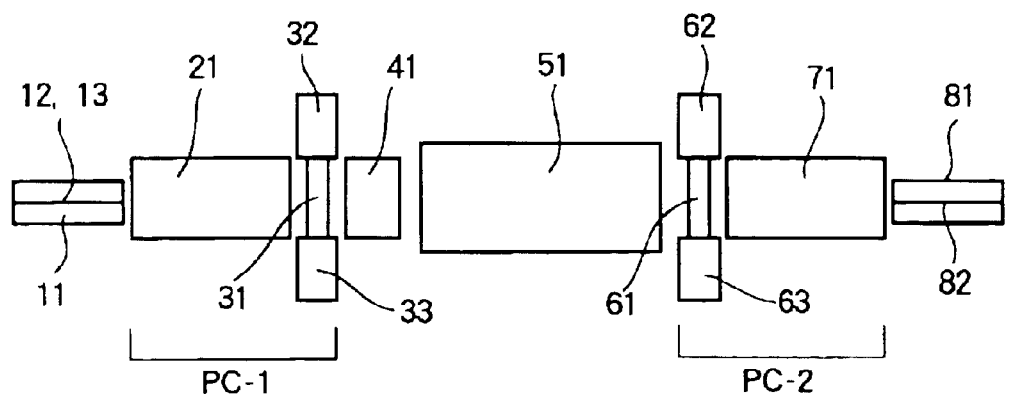
FIG. 15 illustrates a three-port optical circulator.

FIG. 14 illustrates an example of a core chip of a polarization independent optical isolator. A first birefringent block 21, a first Faraday rotator 31, a glass polarization element 43, a second Faraday rotator 61, and a second birefringent block 71 are aligned in this order and bonded together using an optical adhesive. Then, the bonded structure is sliced into chips having a desired size. Permanent magnets 32, 33, 62 and 63 are arranged beside each chip.

A small optical collimator is positioned at the input of the core chip and another small optical collimator at the output. The small optical collimators operate as an optical input port and an optical output port, respectively, thereby implementing an optical circulator and a polarization independent optical isolator. This manufacturing method allows great reduction of assembly cost and provides the supply of miniaturized optical circulators and polarization independent optical isolators.

FIG. 12 illustrates an exemplary configuration of a three-port optical circulator according to the present invention. An optical device constructed of the birefringent block 21 and the double divided-domain Faraday rotator 31 is positioned at the end of optical fibers 12 and 13 securely mounted to a dual-fiber Ferrule or a glass capillary 11. The thus configured optical device is referred to as PC-1, PC-2, etc. The birefringent block 41 and an aspherical lens 51 are positioned downstream of the optical device PC-1 in this order. The birefringent block 41 branches the incident light into different paths depending on the direction of travel of the light. The aspherical lens 51 couples light effectively between the two optical fibers. Another optical device PC-2 and an optical fiber 82 are aligned downstream of the aspherical lens 51 in this order. The optical device PC-2 includes a double divided-domain Faraday rotator 61 and a birefringent block 71. The optical fiber 82 is firmly mounted to a Ferrule or glass capillary 81. The configuration in FIG. 12 reduces the number of required components to six.

Figure 16A:
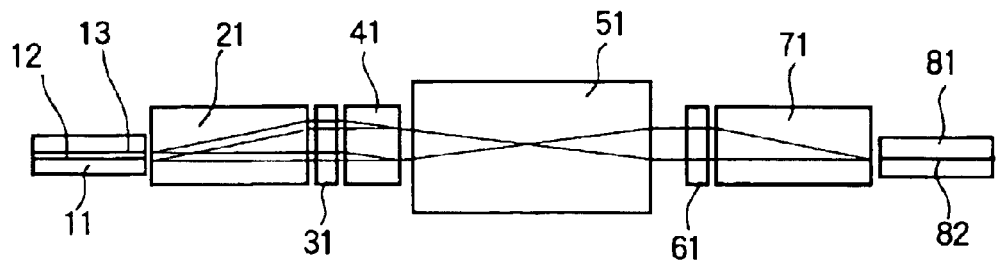
FIGS. 16A–16D are model representations of the three-port optical circulator, illustrating the principle of an optical circulator to which the present invention is applied.
Figure 16B:
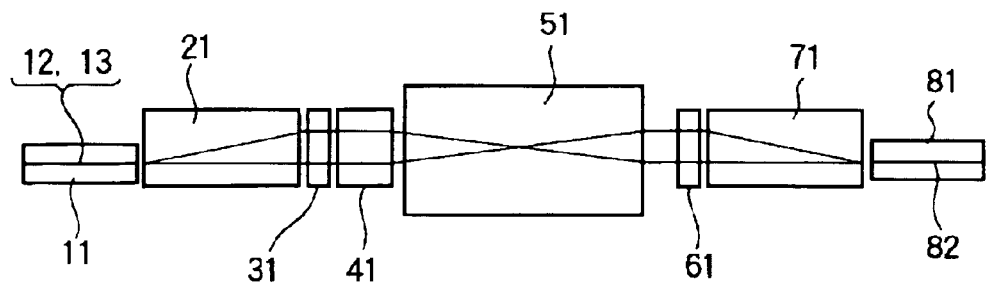
Figure 16C:
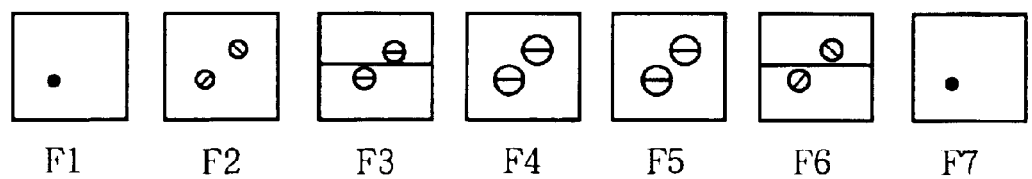

FIGS. 16A–16D are model representations, illustrating the principle of an optical circulator to which the present invention is applied. FIG. 16A is a top view and FIG. 16B is a side view. Referring to FIG. 16C, the birefringent block 21 branches light beam F1 exiting the optical fiber 12 into light beams F2 having polarization planes perpendicular to each other. Diameters in the circular cross sections indicate the direction of polarization plane. When the light beams F2 pass through the double divided-domain Faraday rotator 31, the polarization of planes of the light beams F2 are rotated in opposite directions to each other, thereby becoming light beams F3. The light beams F3 pass through the birefringent block 41 to become light beam F4. The birefringent block 41 is positioned so as to orient the optic axis of the birefringent block 41 such that the light beam from the double divided-domain Faraday rotator 31 is not refracted (ordinary ray). The respective light beams F4 are refracted and condensed by the aspherical lens 51 into light beams F5. Then, the light beams F5 pass through the double divided-domain Faraday rotator 61 to become F6, the polarization planes of the light beams being rotated in opposite directions to each other. The birefringent block 71 couples the light beams F6 into the optical fiber 82.

Figure 16D:
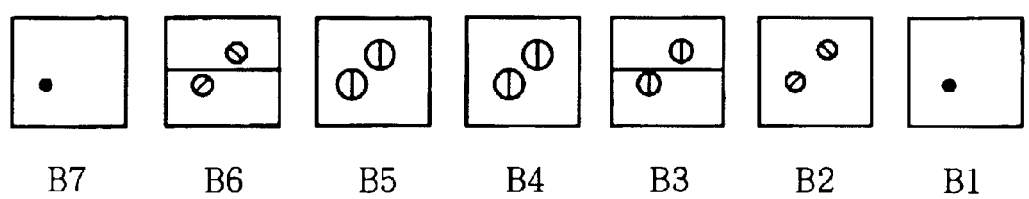

As shown in FIG. 16D, a light beam B1 emitted from the optical fiber 82 is branched by the birefringent block 71 into light beams B2. The light beams B2 pass through the double divided-domain Faraday rotator 61 to become light beams B3, which in turn is refracted and condensed by an aspherical lens 51 into light beams B4. Then, the light beams B4 are refracted by the birefringent block 41 into light beam B5. The polarization planes of the light beams B4 when beams B4 pass through the birefringent block 41 is perpendicular to those of the light beams F3 when the light beams F3 pass the birefringent block 41. Thus, the light beams B4 are refracted as an extraordinary ray, so that the light beams B5 are shifted slightly leftward while the light beams F3 are shifted slightly rightward. The polarization planes of the light beams B5 are rotated by the double divided-domain Faraday rotator 31, so that the light beams B5 becomes the light beams B6. Then, the birefringent block 21 combines the light beams B6 into a single light beam B7 and couples the light beam B7 into the optical fiber 13.

Figure 17A:
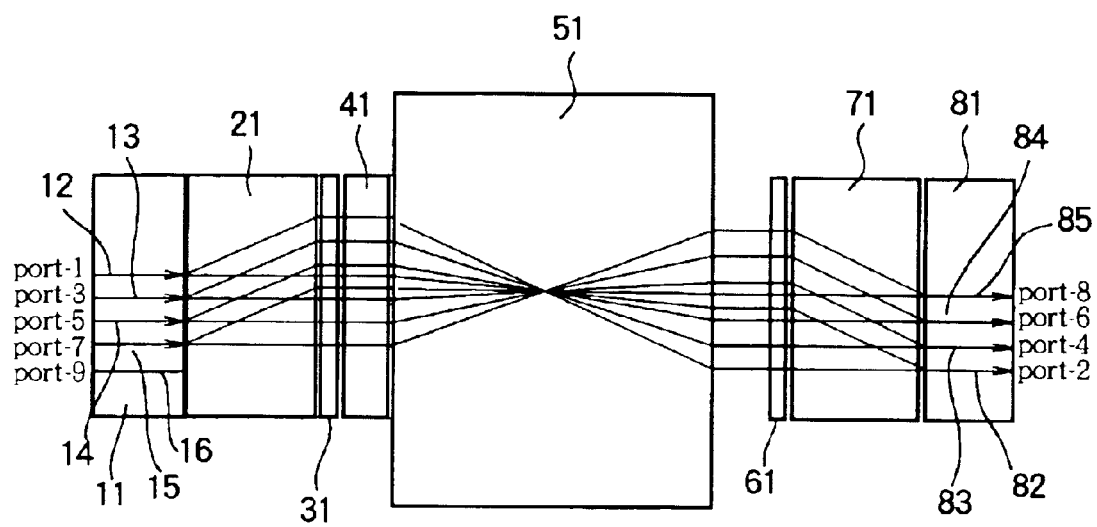
FIGS. 17A and 17B illustrate the optical paths of the multi-port optical circulator.
Figure 17B:
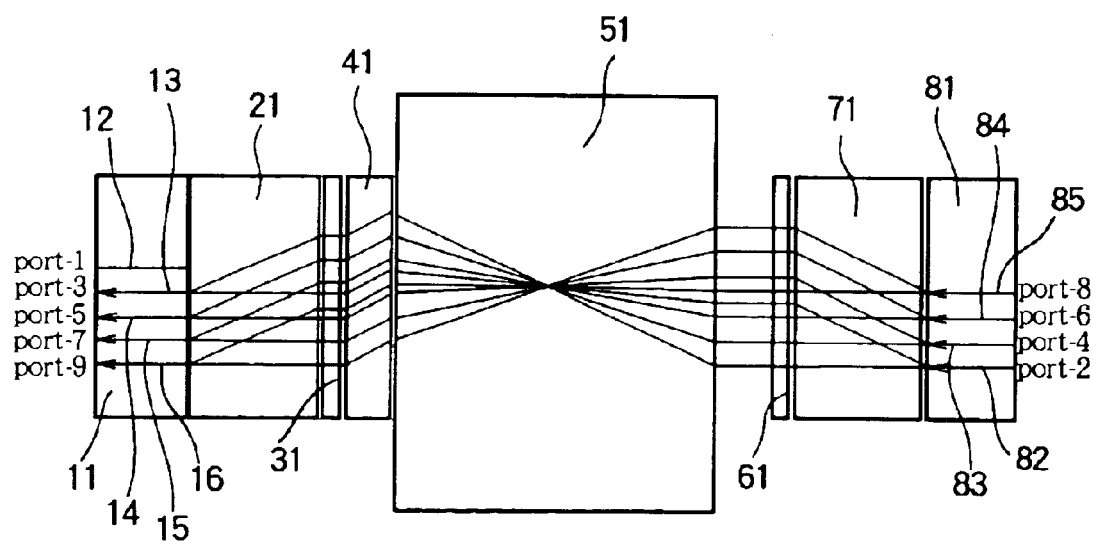

FIGS. 17A and 17B illustrate the operation of a multi-port optical circulator, which is an example of the present invention. The multi port optical circulator can be implemented by mounting optical fibers on a multi-fiber Ferrule or an optical fiber array.

FIGS. 17A and 17B illustrate the optical paths of the multi-port optical circulator. In FIG. 17A, the light beams travel from port-1 to port-2, from port-3 to port-4, from port-5 to port-6, and from port-7 to port-8, respectively. In FIG. 17B, the light beams travel from port-2 to port-3, from port-4 to port-5, and from port-6 to port-7, and from port-8 to port-9, respectively. The light paths in FIGS. 17A and 17B are symmetrical with respect to the center axis of the aspherical lens 51. The structure can accommodate as many ports as required, provided that ports can be physically accommodated, thereby implementing two or more optical circulators using a set of optical components.

The present invention implements a short distance between two optical paths in the double divided-domain Faraday rotator and allows use of a small birefringent block that branches light into separate paths. Thus, the present invention minimizes the divergence of a light beam emitted from an optical fiber, thereby allowing miniaturizing of all the associated optical components. Further, the distance between an optical fiber and a lens can be made short, so that the aberration of the lens is minimized for effectively coupling between optical fibers. As a result, a multi-port configuration can be implemented.

Figure 18:
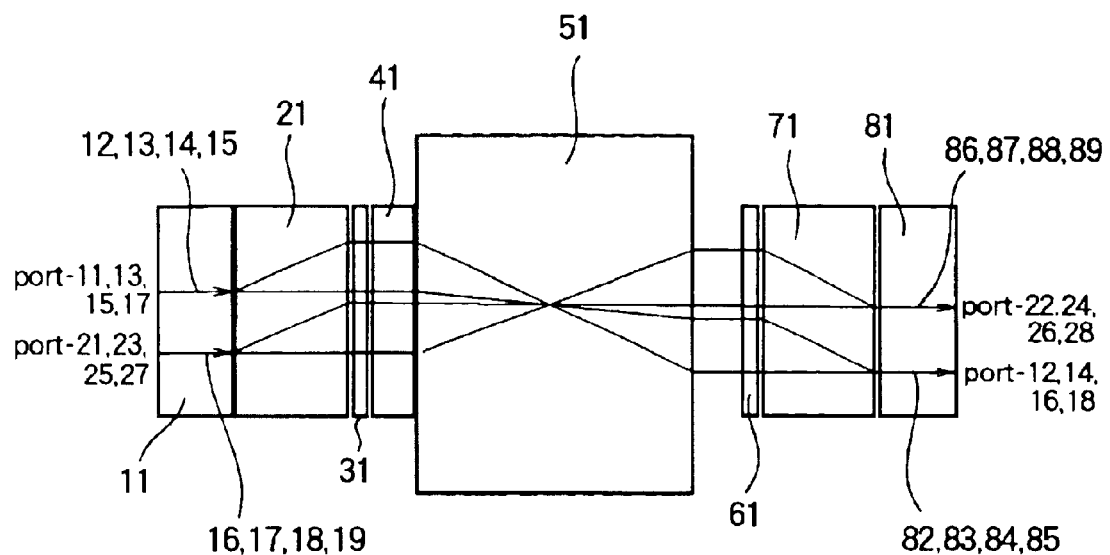
FIG. 18 illustrates the configuration of a multi-port optical circulator that is a combination of the optical circulator in FIG. 19 and the optical circulator in FIG. 9.
Figure 19:
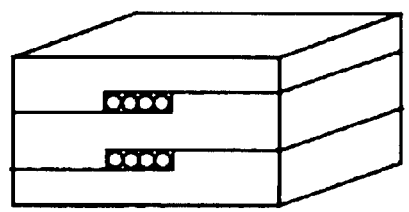
FIG. 19 illustrates an optical fiber array in a multi-stage configuration.

Arranging the optical fiber array in a multi-stage configuration as shown in FIG. 19 makes optical paths symmetrical with respect to the center axis of the aspherical lens. Such a multi-stage configuration can perform as two or more optical circulators. Also, the composite structure of an optical circulator and a polarization independent optical isolator can be made by arranging a birefringent block and a glass polarization element in parallel with respect to the optical path to form a component 41 in FIG. 18. The operation of a multi-stage structure in a lateral plane is the same as that in FIGS. 17A and 17B and that of a later described polarization independent optical isolator (FIG. 20).

Figure 20:
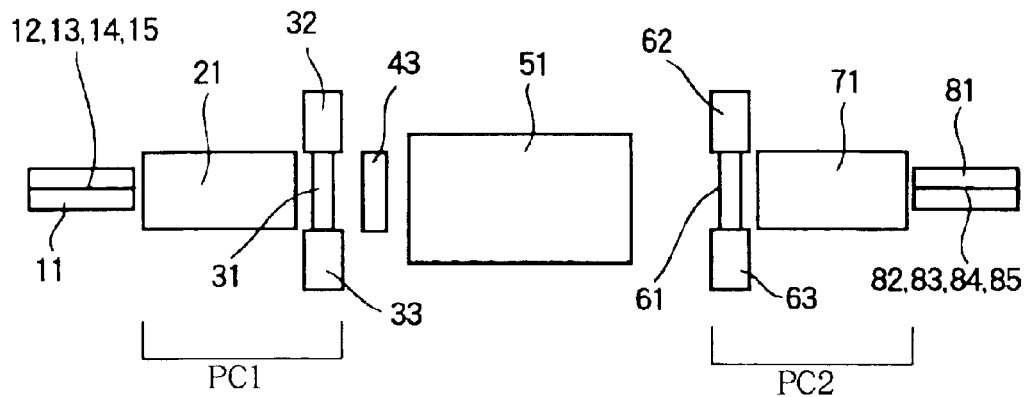
FIG. 20 illustrates the configuration of a polarization independent optical isolator according to the present invention.

FIG. 20 illustrates the configuration of a polarization independent optical isolator according to the present invention. By using a multi-fiber Ferrule and an optical fiber array, the optical fibers can be accurately arranged laterally in a direction parallel to the boundary between the two magnetic domains on the double divided-domain Faraday rotator. This structure implements a multi-port polarization independent optical isolator in which light beams pass through the same optical components regardless of the optical paths in which the light beams pass.

The optical device PC-1 of the invention is positioned at the end surface of the optical fiber 12 firmly mounted to the Ferrule 11. The optical device PC-1 includes the birefringent block 21 and the double divided-domain Faraday rotator 31 beside which the permanent magnets 32 and 33 are arranged. The glass polarization element 43 is placed after the double divided-domain Faraday rotator 31 so as to transmit or block the light beams depending on the direction of travel of the light beams. Then, the aspherical lens 51 is positioned after the optical device PC-1 so as to couple the light between the optical fiber 12 and the optical fiber 82. After the aspherical lens 51, another optical device PC-2 similar to PC-1 and the optical fiber 82 firmly mounted on, for example, the Ferrule 81 are arranged in this order. The light emitted from the optical fiber 12 is split by the optical device PC-1 into two light beams polarized in the same direction. The glass polarization element 43 is positioned so that the light beams having polarization planes in the same direction can pass through the glass polarization element 43. The two light beams that have passed through the glass polarization element 43 are refracted and condensed by the aspherical lens 51. Then, the two light beams pass through the optical device PC-2, the polarization planes of the two light beams being rotated to become perpendicular to each other. Then, the two light beams are coupled into the optical fiber 82.

The light emitted from the optical fiber 81 is split by the birefringent block 7 into two light beams polarized in the same direction. Because the polarization planes of the two light beams are perpendicular to the polarization direction of light that is allowed to pass through the glass polarization element 43, the light beams are blocked by the glass polarization element 43 with the result that the two light beams are not coupled into the optical fiber 12. Thus, the configuration in FIG. 20 operates as a high performance polarization independent optical isolator.

Figure 25:
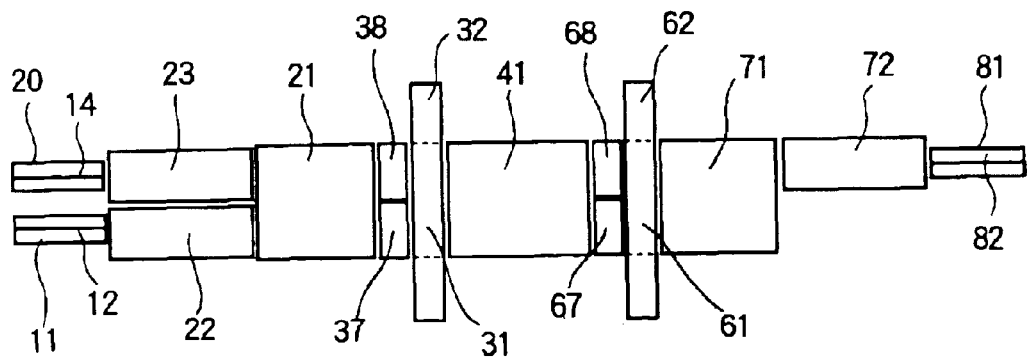
FIG. 25 illustrates an optical circulator disclosed in Japanese Patent No. 2539563.
Figure 26:
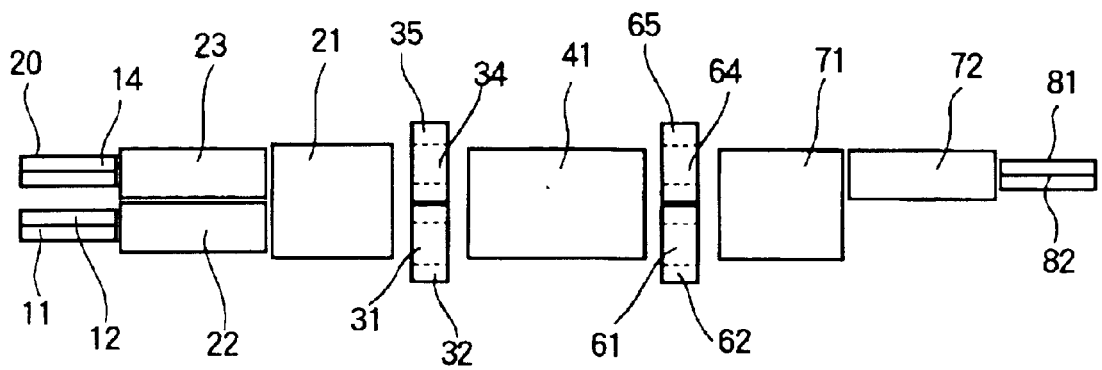
FIG. 26 illustrates another optical circulator disclosed in Japanese Patent No. 2539563.
Figure 27:
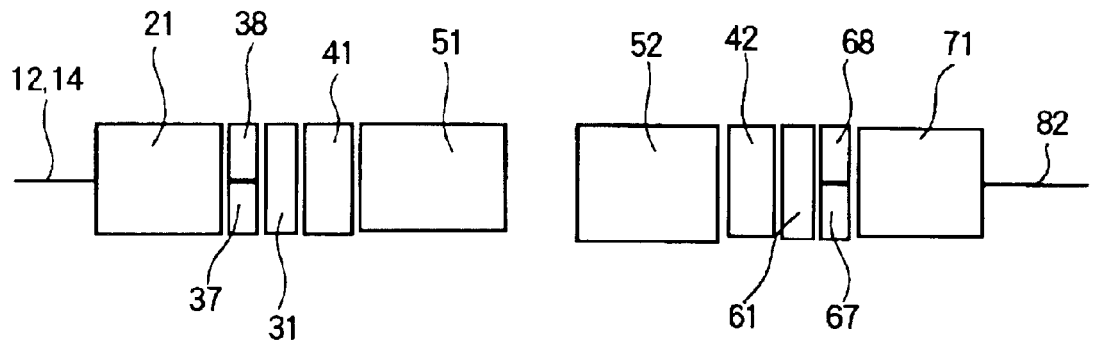
FIG. 27 illustrates another optical circulator disclosed in U.S. Pat. No. 5,991,076.
Figure 28:
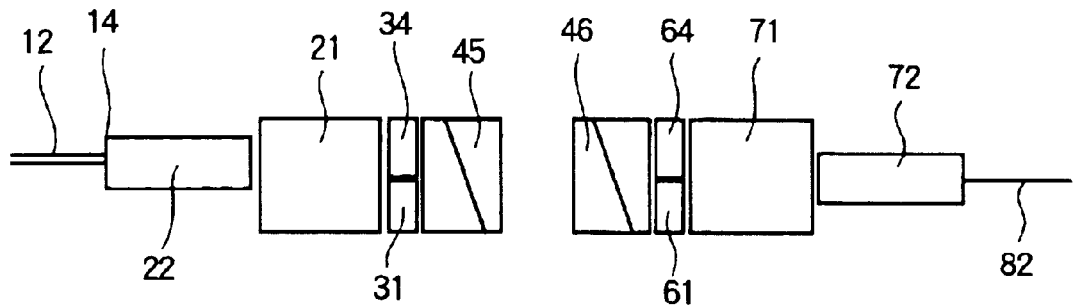
FIG. 28 illustrates another optical circulator disclosed in U.S. Pat. No. 6,049,426.

With continuing miniaturization of collimators in recent years, GRIN lenses with a diameter of about 0.6 mm or smaller and collimators using these lenses have also been prototyped. Thus, optical collimators will be miniaturized further and such miniaturized collimators will become commercially available. Combining these miniaturized optical collimators with a double divided-domain Faraday rotator according to the present invention implements the miniaturization and low cost of optical devices. For the prior art optical circulators (Japanese Patent No. 2539563) in FIGS. 25 and 26, Faraday rotators or wave plates require to be arranged in parallel with respect to the light path. In contrast, it is a feature of the present invention that the double divided-domain Faraday rotator is in the form of a single piece of Faraday rotator.

Figure 21:
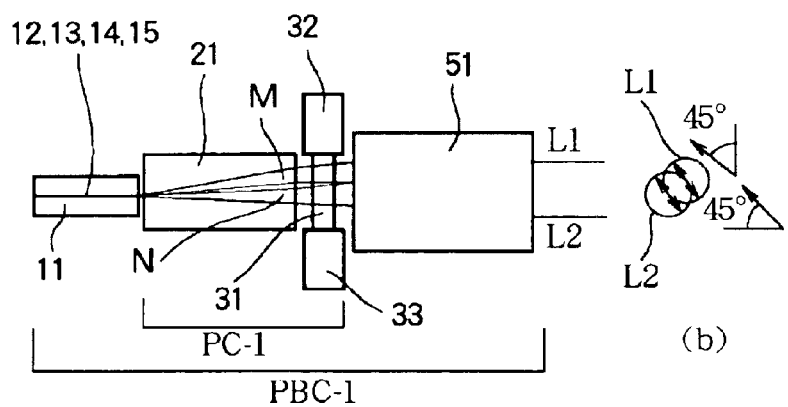
FIG. 21 illustrates a configuration of a polarization beam combiner according to the present invention.

FIG. 21 illustrates a configuration of a polarization beam combiner according to the present invention.

Referring to FIG. 21, the optical fiber 12 firmly mounted to the multi-fiber ferrule 11, the optical device PC-1 in FIG. 1, and the aspherical lens 51 are aligned in this order. The optical device PC-1 splits the light emitted from the optical fiber 12 into two light beams that have the same polarization plane. The two light beams are refracted and condensed by the aspherical lens 51, and subsequently emitted as light beams parallel to each other.

The beam combiner according to the present invention is featured as follows:

If the light beam entering the beam combiner has a polarization plane in the same direction as the light beam exiting the beam combiner, the light beam that has entered the beam combiner is not coupled into the optical fiber 12.

If the light beam entering the beam combiner has a polarization plane in a direction perpendicular to the light beam exiting the beam combiner, the light beam that has entered the beam combiner is coupled into the optical fiber 12.

Referring to FIG. 21, the light emitted from the optical fiber is split into a beam N that travels straight and a beam M that travels obliquely, the beams N and M diverging gradually.

Figure 22:
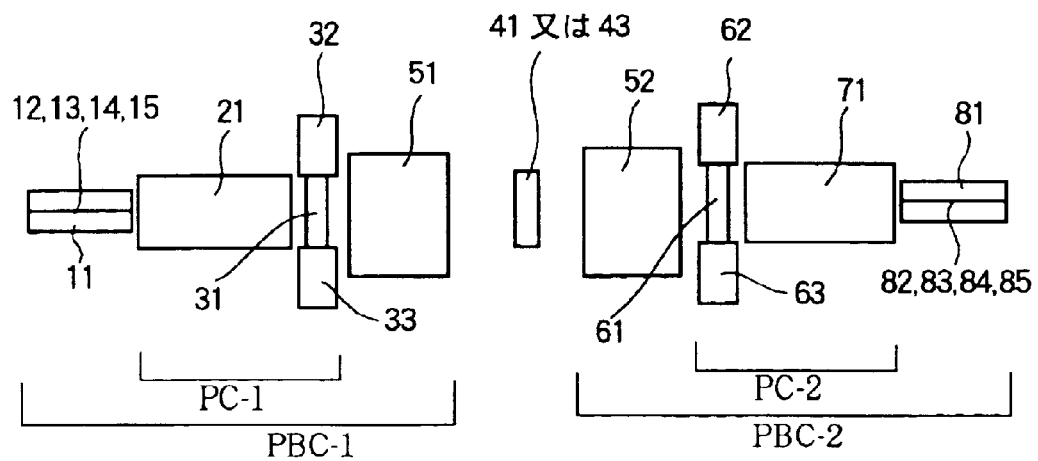
FIG. 22 illustrates an optical circulator that utilizes a polarization beam combiner according to the present invention.

FIG. 22 illustrates an optical circulator that utilizes a polarization beam combiner according to the present invention. The birefringent block 41 is positioned between the polarization beam combiners PBC-1 and PBC-2. Because of the aforementioned characteristics of the polarization combiner of the invention, the configuration in FIG. 22 operates as an optical circulator.

By replacing the birefringent block 41 in FIG. 22 with the glass polarization element 43, a polarization independent optical isolator can be configured which utilizes a polarization beam combiner according to the present invention. Specifically, the glass polarization element 43 is placed between the polarization beam combiners PBC-1 and PBC-2. Because of the aforementioned characteristics of the polarization beam combiner of the invention, the resulting configuration in FIG. 22 operates as an polarization independent optical isolator.

Figure 23:
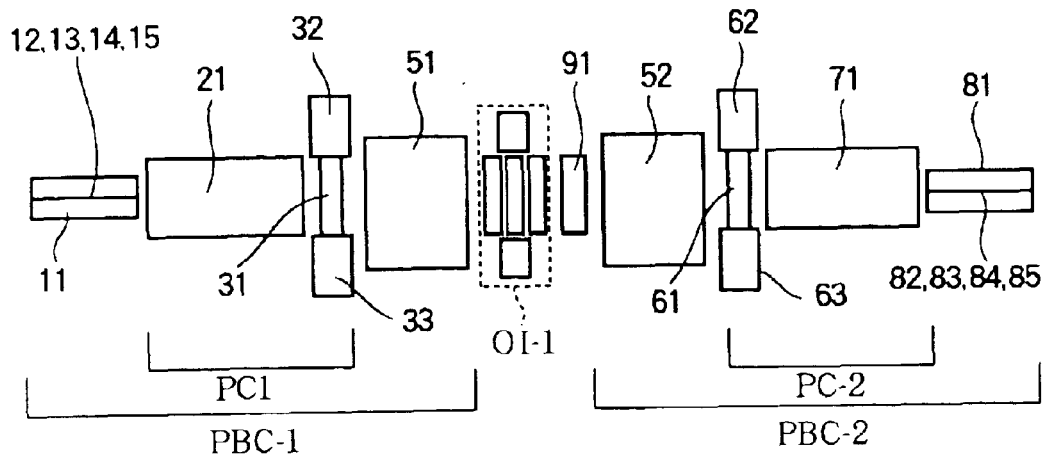
FIG. 23 illustrates an example of a polarization independent optical isolator of the present invention.

FIG. 23 illustrates an example of a polarization independent optical isolator of the present invention. A 45-degree Faraday rotator and a commercially available polarization dependent optical isolator OI-1 are positioned between the polarization beam combiners PBC-1 and PBC-2. The optical isolator OI-1 includes two glass polarization elements and a Faraday rotator. Thus, polarization independent optical isolator of high performance can be configured.

Figure 24:
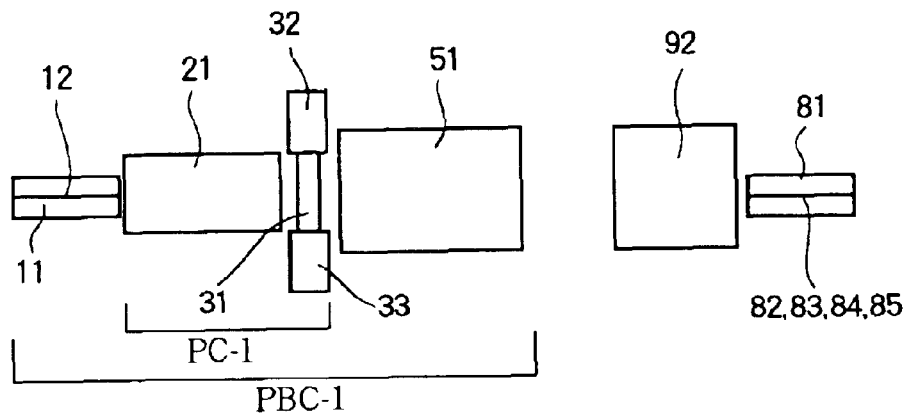
FIG. 24 illustrates an in-line type polarization beam combiner of the present invention.

FIG. 24 illustrates an in-line type polarization beam combiner of the present invention. The lens 92 couples the light emitted from the polarization beam combiner PBC-1 into the optical fiber 82, so that the entire configuration operates as an in-line type polarization beam combiner.

In practicing the present invention, a device that firmly holds the optical fibers can be any of a multi-fiber Ferrule or a glass capillary, an optical fiber array, and a V-grooved mounting member. The multi-fiber Ferrule and optical fiber array are preferably used for their positioning accuracy of the device and availability of the device. Additionally, machining the end of the optical fiber into a lens-shape allows further miniaturization of the optical device.

In practicing the present invention, the birefringent block need not be of any special type but may be selected from among commercially available birefringent blocks as required. A rutile single crystal and a YVO4 single crystal are preferred in terms of quality and availability.

The magnets and Faraday rotator can be arranged relative to each other in different ways.

The lens can be selected from among an aspherical lens, a GRIN lens, and a spherical lens. An aspherical lens is preferred since optical coupling efficiency is determined by aberration.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An optical device comprising:
   a Faraday rotator made of a bismuth substituted rare earth iron garnet single crystal film having a Faraday rotation of 45 degrees; and
   permanent magnets arranged beside said Faraday rotator to define two or more than two areas of a single domain structure in said Faraday rotator;
   wherein adjacent areas are magnetized in opposite directions to cause polarization planes of light beams passing through the adjacent areas to rotate in opposite directions, and the optical device satisfies the relation expressed by equation (1)

$$Hs/Br/DH > \Delta D/2 > 0 \qquad (1)$$

where Hs (Oe) is a saturation magnetic field of the bismuth substituted rare earth iron garnet single crystal film, DH (cm$^{-1}$) is a rate of change in magnetic field in the proximity to a boundary between the adjacent areas, Br (Gauss) is a residual flux density of said permanent magnets, and $\Delta D$ is a distance between the two light beams.

2. The optical device according to claim 1, wherein said Faraday rotator and said permanent magnets are in the relation expressed by equation (2)

$$(Dw^*/H^*)/(1/Br/DH) \qquad (2)$$

where H* is a lower limit of the magnetic field at which a width of a magnetic domain in a peripheral portion of said Faraday rotator starts to change more rapidly than a width of a magnetic domain in a middle portion of said Faraday rotator, and Dw* is a width of magnetic domain when the magnetic field is H*.

3. The optical device according to claim 1, wherein said Faraday rotator and permanent magnets are in the relation expressed by equation (3)

$$-0.0000172 Hs + 0.0312 > (Hs/Br/DH) \qquad (3).$$

4. The optical device according to claim 3, wherein said permanent magnets include two permanent magnets arranged with the Faraday rotator positioned therebetween, each of the two permanent magnets having a residual magnetic flux density Br in the range of 9000 to 12000 (Gauss), the two permanent magnets being spaced apart by a distance in the range of 0.08 to 0.18 cm so that DH is in the range of 2 to 5 $(cm^{-1})$;

ΔD is in the range of 0.005 to 0.05 (cm) and said Faraday rotator has a saturation magnetic field equal to or less than 750 (Oe).

5. The optical device according to claim 3, wherein said permanent magnets includes at least three permanent magnets each of which has a residual magnetic flux density Br in the range of 9000 to 12000 (Gauss), said at least three permanent magnets being aligned beside at least one side of said Faraday rotator at intervals in the range of 0.06 to 0.10 (cm) so that DH is in the range of 0.7 to 1.2 $(cm^{-1})$;

ΔD is in the range of 0.005 to 0.05 (cm) and said Faraday rotator has a saturation magnetic field equal to or less than 300 (Oe).

* * * * *